(12) United States Patent
Naegle

(10) Patent No.: US 6,943,796 B2
(45) Date of Patent: Sep. 13, 2005

(54) METHOD OF MAINTAINING CONTINUITY OF SAMPLE JITTER PATTERN ACROSS CLUSTERED GRAPHICS ACCELERATORS

(75) Inventor: Nathaniel David Naegle, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 236 days.

(21) Appl. No.: 10/624,943

(22) Filed: Jul. 22, 2003

(65) Prior Publication Data

US 2005/0001844 A1 Jan. 6, 2005

Related U.S. Application Data

(60) Provisional application No. 60/397,597, filed on Jul. 22, 2002.

(51) Int. Cl.$^7$ .......................... G06F 15/16; G06F 12/00
(52) U.S. Cl. ..................... 345/503; 345/564; 345/506
(58) Field of Search .......................... 345/501–506, 345/530, 564, 561, 611, 418, 426, 581, 643, 629

(56) References Cited

U.S. PATENT DOCUMENTS

| | | | |
|---|---|---|---|
| 6,417,861 B1 * | 7/2002 | Deering et al. ............. | 345/589 |
| 6,459,428 B1 * | 10/2002 | Burk et al. ................. | 345/419 |
| 6,501,483 B1 * | 12/2002 | Wong et al. ................ | 345/581 |
| 6,885,384 B2 * | 4/2005 | Deering et al. ............. | 345/564 |
| 2002/0000988 A1 * | 1/2002 | Nelson et al. .............. | 345/443 |
| 2002/0050979 A1 * | 5/2002 | Oberoi et al. .............. | 345/157 |

* cited by examiner

Primary Examiner—Kee M. Tung
(74) Attorney, Agent, or Firm—Meyertons Hood Kivlin Kowert & Goetzel, PC; Jeffrey C. Hood; Mark K. Brightwell

(57) ABSTRACT

A system and method are disclosed to allow the tiling of sample jitter patterns to be independent of the tiling of clustered graphics accelerators. Each accelerator uses an x,y "bias" offset to shift the origin of the jitter pattern within the sample space region addressed by the accelerator. In this way, multiple accelerators may be programmed so that their jitter patterns integrate into one global pattern without discontinuities at the region boundaries.

32 Claims, 32 Drawing Sheets

Populate a 2 x 2 Sample Bin Array 1 to 16 Sample Locations / Bin

Select an Array of Transformations from:

| iy | ix | s | Transformation |
|----|----|----|----------------|
| 0 | 0 | 0 | none |
| 0 | 0 | 1 | swapXY: mirror about y = -x -1 |
| 0 | 1 | 0 | invertX: mirror about y |
| 0 | 1 | 1 | rotate 270 degrees clockwise |
| 1 | 0 | 0 | invertY: mirror about x |
| 1 | 0 | 1 | rotate 90 degrees clockwise |
| 1 | 1 | 0 | rotate 180 degrees |
| 1 | 1 | 1 | mirror about y = x |

Apply Inner Transformation Array to 2 x 2 Array to obtain a 16 x 16 Inner Bin Array (IBA)

Apply Outer Transformation Array to Inner Bin Array to obtain a 128 x 128 Outer Bin Array (OBA)

METHOD OF MAINTAINING CONTINUITY OF SAMPLE JITTER PATTERN ACROSS CLUSTERED GRAPHICS ACCELERATORS

PRIORITY CLAIM

This application claims the benefit of U.S. Provisional Application No. 60/397,596, filed on Jul. 22, 2002, entitled Method of Maintaining Continuity of Sample Jitter Pattern Across Clustered Graphics Accelerators, invented by Nathaniel David Naegle, which is hereby incorporated by reference in its entirety as though fully and completely set forth herein.

BACKGROUND OF THE INVENTION

1. Field of the Invention

This invention relates generally to the field of computer graphics and, more particularly, to a high performance graphics system which implements super-sampling.

2. Description of the Related Art

A computer system typically relies upon its graphics system for producing visual output on the computer screen or display device. Early graphics systems were only responsible for taking what the processor produced as output and displaying that output on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display images that are more complex with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. However, with a powerful graphics system, the CPU may send a request to the graphics system stating: "draw a box at these coordinates". The graphics system then draws the box, freeing the processor to perform other tasks.

Since graphics systems typically perform only a limited set of functions, they may be customized and therefore far more efficient at graphics operations than the computer's general-purpose central processor. Graphics system processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Early graphics systems were limited to performing two-dimensional (2D) graphics. Their functionality has since increased to support three-dimensional (3D) wire-frame graphics, 3D solids, and now includes support for three-dimensional (3D) graphics with textures and special effects such as advanced shading, fogging, alpha-blending, and specular highlighting.

While the number of pixels is an important factor in determining graphics system performance, another factor of equal import is the quality of the image. Various methods are used to improve the quality of images, such as anti-aliasing, alpha blending, and fogging. While various techniques may be used to improve the appearance of computer graphics images, they also have certain limitations. In particular, they may introduce their own image aberrations or artifacts, and are typically limited by the density of pixels displayed on the display device.

As a result, a graphics system is desired which is capable of utilizing increased performance levels to increase not only the number of pixels rendered, but also the quality of the image rendered. In addition, a graphics system is desired which is capable of utilizing increases in processing power to improve graphics effects.

Prior art graphics systems have generally fallen short of these goals. Prior art graphics systems use a conventional frame buffer for refreshing pixel/video data on the display. The frame buffer stores rows and columns of pixels that exactly correspond to respective row and column locations on the display. Prior art graphics systems render 2D and/or 3D images or objects into the frame buffer in pixel form, and then read the pixels from the frame buffer to refresh the display. To reduce visual artifacts that may be created by refreshing the screen at the same time as the frame buffer is being updated, most graphics systems' frame buffers are double-buffered.

To obtain images that are more realistic, some prior art graphics systems have implemented super-sampling by generating more than one sample per pixel. By calculating more samples than pixels (i.e., super-sampling), a more detailed image is calculated than can be displayed on the display device. For example, a graphics system may calculate a plurality of samples for each pixel to be output to the display device. After the samples are calculated, they are then combined, convolved, or filtered to form the pixels that are stored in the frame buffer and then conveyed to the display device. Using pixels formed in this manner may create a more realistic final image because overly abrupt changes in the image may be smoothed by the filtering process.

As used herein, the term "sample" refers to calculated information that indicates the color of the sample and possibly other information, such as depth (z), transparency, etc., of a particular point on an object or image. For example, a sample may comprise the following component values: a red value, a green value, a blue value, a z value, and an alpha value (representing the transparency of the sample).

SUMMARY

A system and method are disclosed to allow the tiling of sample jitter patterns to be independent of the tiling of clustered graphics accelerators. Each accelerator uses an x,y "bias" offset to shift the origin of the jitter pattern within a sample space region addressed by the accelerator. In this way, multiple accelerators may be programmed so that their jitter patterns line up across the boundaries defining their regions.

In one set of embodiments, the system for generating sample locations that span a plurality of local coordinate systems may include a plurality of sample generation circuits. Each circuit may receive a two-dimensional bin address specifying a position of a bin in a local sample space region served by the circuit, and a two-dimensional bin offset of an origin of a coordinate system for the local sample space region with respect to an origin of a global sample space coordinate system that contains the local sample space region. Each circuit may generate an output sequence of one or more sample displacements that correspond to a pre-selected transformation applied to a pre-selected set of sample displacements corresponding to a global address, where the global address is the vector sum of the two-dimensional bin address and the two-dimensional bin offset. The pre-selected transformation may be a pre-selected set of two or more transformations sequentially applied to a pre-selected set of sample displacements corresponding to the global address.

The system may include a plurality of graphics accelerators, wherein each graphics accelerator has one or more local coordinate systems $L_K$ for a region $R_K$ of global sample space, where each graphics accelerator may include one or more rendering pipelines, sample buffers and filtering units, and where each rendering pipeline and each filtering unit may have a sample generation circuit. Each graphics accelerator may generate video pixels corresponding to one or more regions of global sample space, and the plurality of graphics accelerators may collaboratively generate a composite image for one or more display devices. The system may also include a host computer that may coordinate the generation of sample locations across the multiple local coordinate systems, by sending a two-dimensional offset for each local coordinate system $L_K$ to the corresponding graphics accelerator.

The method for generating sample locations spanning a plurality of local coordinate systems may include transferring a two-dimensional bin offset to each of a plurality of sample generation circuits, where the two-dimensional bin offset equals the displacement of an origin of a corresponding local coordinate system with respect to an origin of a global coordinate system. Each sample generation circuit may perform the actions of: a) receiving a two-dimensional local address of a sample bin with respect to the local coordinate system and adding the two-dimensional local address to the corresponding two-dimensional bin offset to determine a two-dimensional global bin address, b) operating on a first portion of the two-dimensional global bin address to identify a corresponding transformation based on the first portion and a pre-selected pattern of transformations that span global sample space, c) applying an inverse of the first transformation to a second portion of the two-dimensional global bin address to determine a modified two-dimensional address, d) reading first sample displacements from a sample location memory using the modified two-dimensional address, e) applying the first transformation to the first sample displacements to determine second sample displacements, and f) adding the second sample displacements to the two-dimensional local address of the sample bin to generate local sample locations.

In some embodiments, a graphics system may include a first plurality of sample generation circuits. Each of the sample generation circuits may be configured to (a) receive a two-dimensional bin address specifying a position of a bin in a local coordinate system corresponding to the circuit, and a two-dimensional bin displacement of an origin of the local coordinate system with respect to an origin of a window; (b) determine a window-relative bin address of the bin by computing a vector sum of the two-dimensional bin address and the two-dimensional bin displacement; and (c) generate an output sequence of one or more sample displacements that correspond to a transformation designated by the window-relative bin address. The first plurality of sample generation circuits may reside in respective rendering units of a graphics accelerator. The rendering units may generate samples based on the sample locations generated by the sample generation circuits, and store the samples into a sample buffer.

A host computer may set the two-dimensional bin displacement of each sample generation circuit equal to a displacement from an origin of the global sample space coordinate system to an origin of a region served by the graphics accelerator.

The graphics accelerator may further include a set of filtering units to read samples from the sample buffer and filter the samples to generate video output pixels. Each filtering unit may include a window ID table, an N-register, and a sample generation circuit. The window ID table may be configured to output a displacement ($W_X$, $W_Y$) of a window with respect to an origin of a global sample space coordinate system in response to receiving a window ID. The N-register may be configured to store a displacement ($N_X$, $N_Y$) of a first coordinate system with respect to an origin of the global sample space coordinate system.

The sample generation circuit of a filtering unit may include a subtraction unit, an adder unit, a transformation control unit, an address transform unit, a sample location memory and an output transform unit. The subtraction unit may be configured to compute a displacement ($M_X$, $M_Y$) by subtracting the displacement ($W_X$, $W_Y$) from the displacement ($N_X$, $N_Y$). The adder unit may be configured to receive a bin address (X,Y) specifying a position of a bin in the first coordinate system, and to compute a window-relative bin address by adding the bin address (X,Y) to the displacement ($M_X$, $M_Y$).

The transformation control unit may be configured to receive a first portion of the window-relative bin address and identify a corresponding transformation based on the first portion and a pre-selected pattern of transformations. The address transform unit may be configured to apply an inverse of the identified transformation to a second portion of the two-dimensional window-relative bin address, thereby generating a memory address defining a bin from a tile of bins containing pre-selected sample displacements.

The sample location memory may be configured to store the pre-selected sample displacements for a tile of bins, wherein the sample location memory is configured to output a first sequence of sample displacements in response to receiving the memory address. The output transform unit may be configured to apply the identified transformation to the first sequence of sample displacements, thereby generating a second output sequence of sample displacements.

BRIEF DESCRIPTION OF THE DRAWINGS

A better understanding of the present invention can be obtained when the following detailed description is considered in conjunction with the following drawings, in which.

Figure 1:
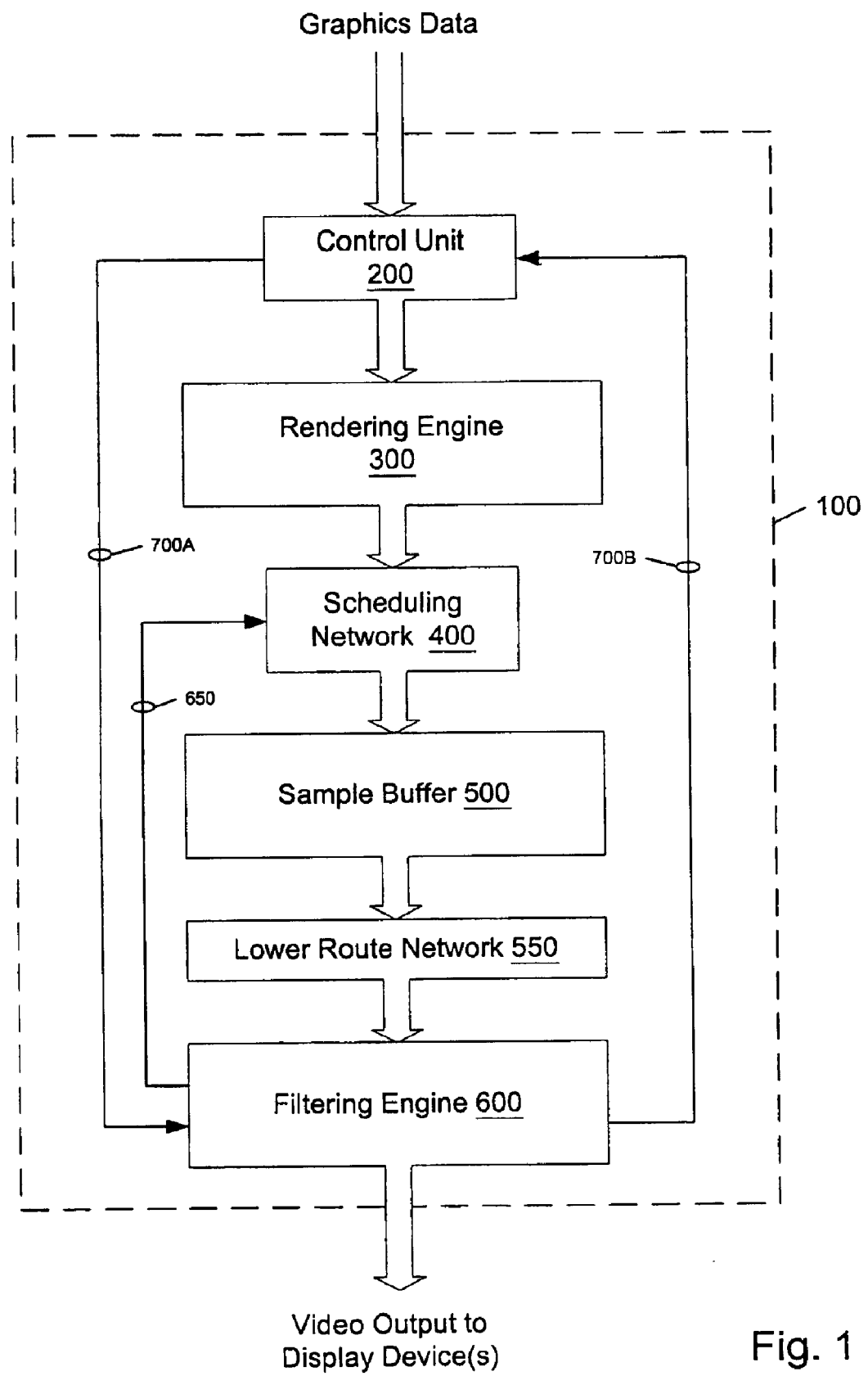
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400 a sample buffer 500 a lower route network 550, and a filtering engine 600.

Figure 2:
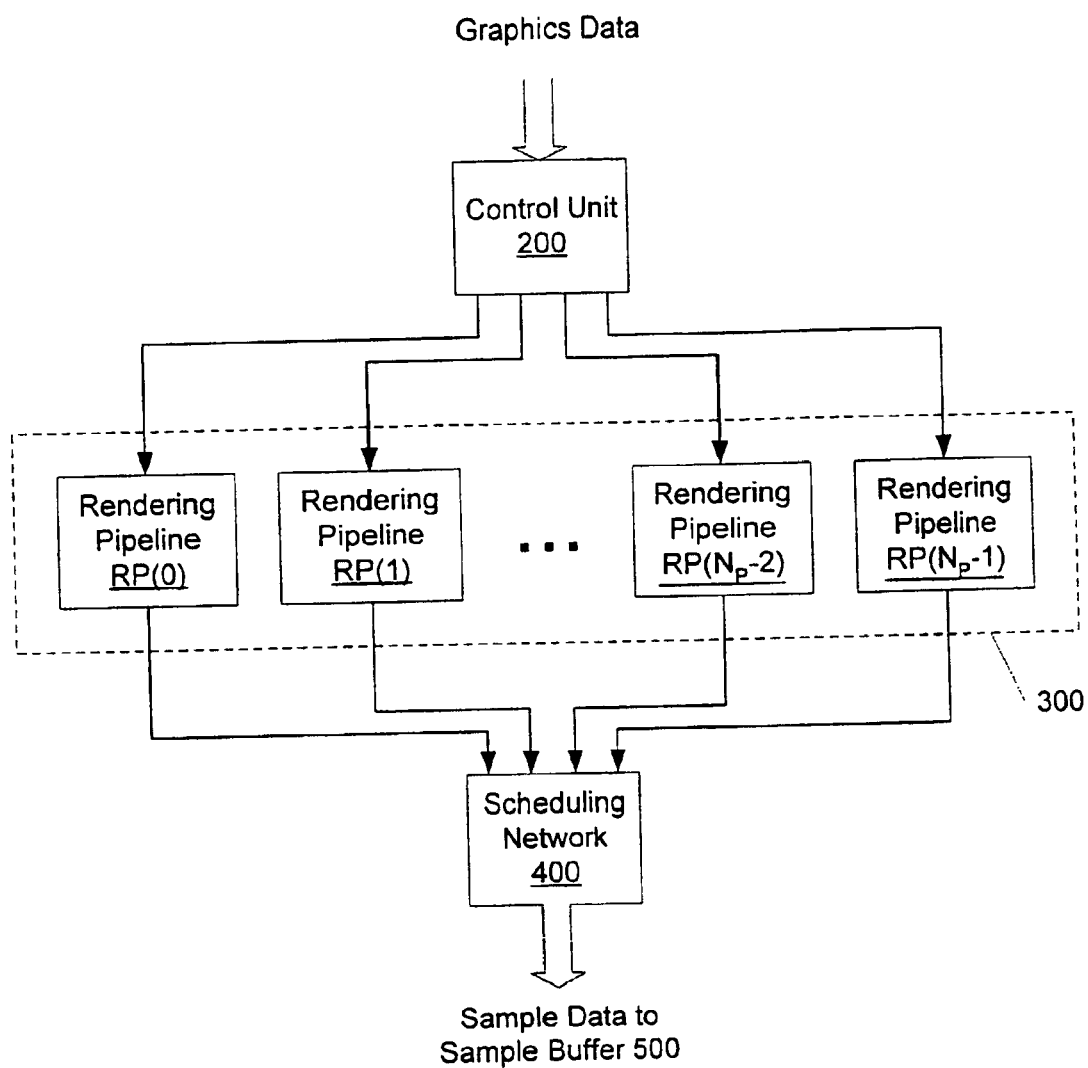
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}$-1), are configured to operate in parallel. For example, in one embodiment, $N_{PL}$ equals four. In another embodiment, $N_{PL}$=8.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500 to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to $N_D$ independent video pixel streams denoted VPS(0), VPS(1), . . . , VPS($N_D$-1), where $N_D$ is a positive integer. Thus, a set of host applications (running on a host computer) may send $N_D$ graphics data streams denoted GDS(0), GDS(1), . . . , GDS($N_D$-1) to the graphics system 100. The rendering engine 300 may perform rendering computations on each graphics data stream GDS(I), for I=0, 1, 2, . . . , $N_D$-1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The $N_D$ analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
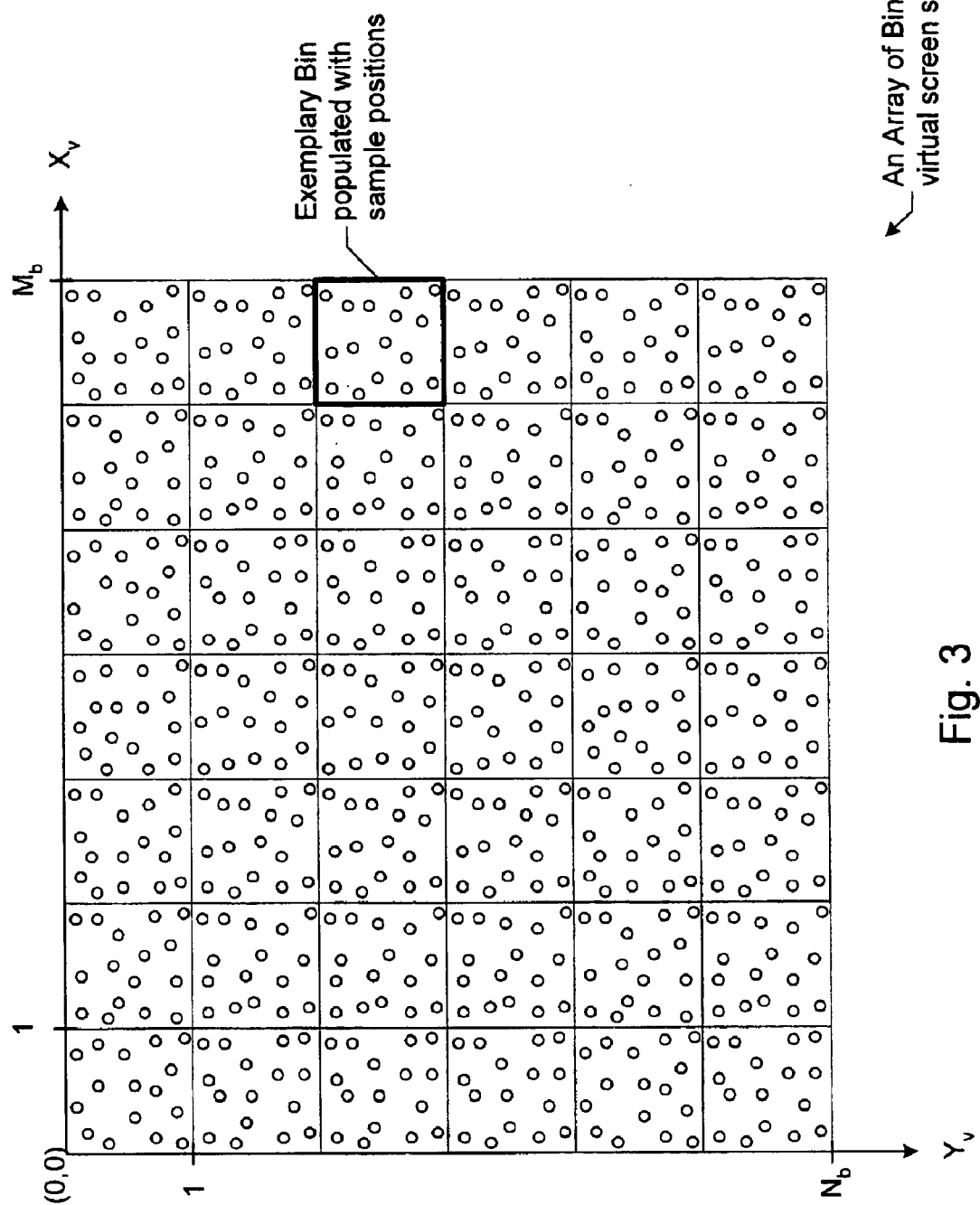
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;

(b) determine which of the $N_{s/b}$ sample positions reside interior to the primitive;

(c) compute a sample for each of the interior sample positions, and (d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
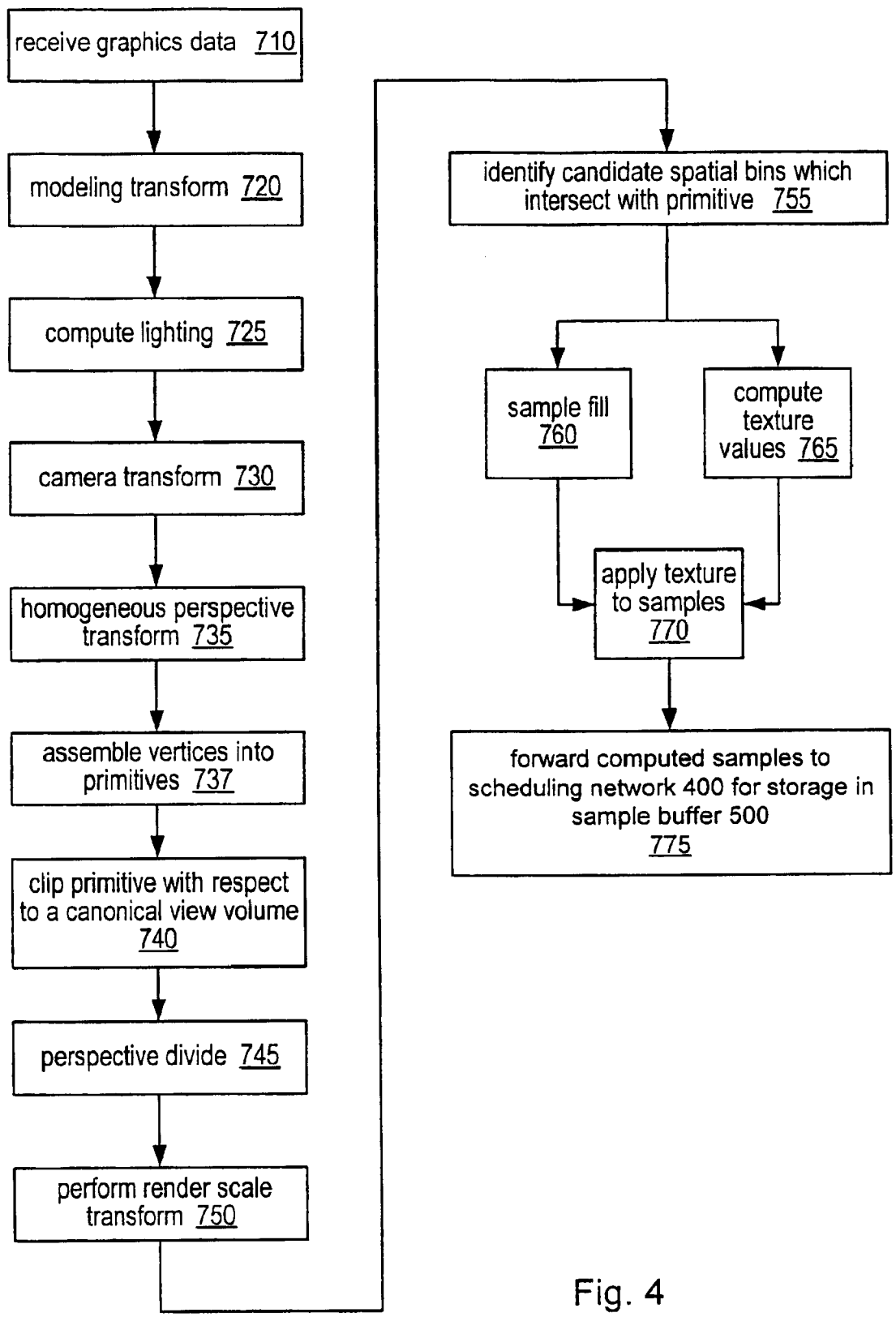
FIG. 4 illustrates one set of embodiments of a rendering methodology which may be used to generate samples in response to receiving a stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the vertices of polygonal primitives based on one or more of the following:

(1) the vertex normals;
(2) the position and orientation of a virtual camera in the world coordinate system;
(3) the intensity, position, orientation and type-classification of light sources; and
(4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may be updated whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

$T1=(-W \leq X)$ $T2=(X \leq W)$ $T3=(-W \leq Y)$ $T4=(Y \leq W)$ $T5=(-W \leq Z)$ $T6=(Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X,Y,Z,W) according to the relations $x=X/W$ $y=Y/W$ $z=Z/W.$ After the perspective divide, the x and y coordinates of each vertex (x,y,z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_v$ and $Y_v$ denote the horizontal and vertical coordinate respectively in the virtual screen space.

Figure 5:
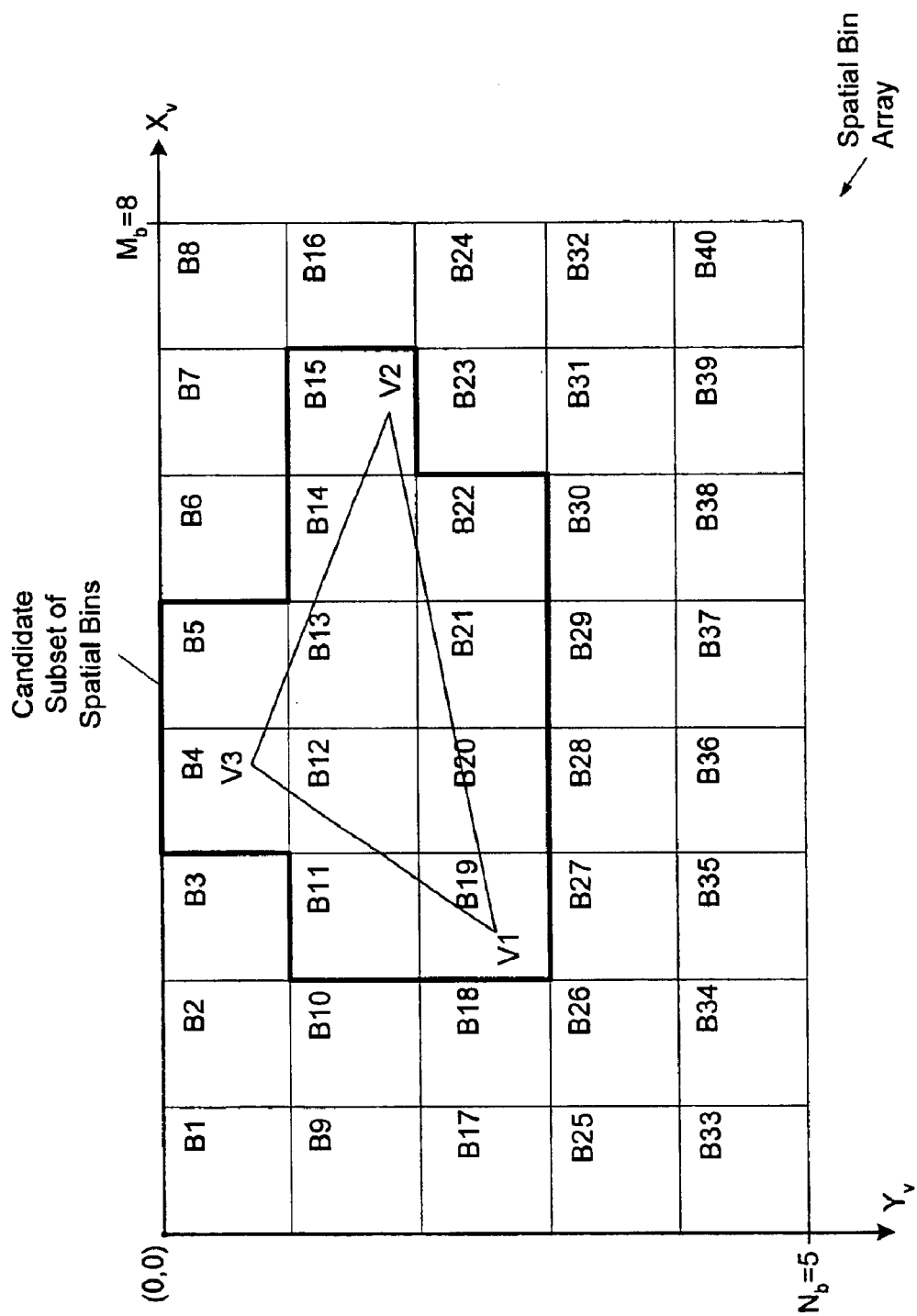
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
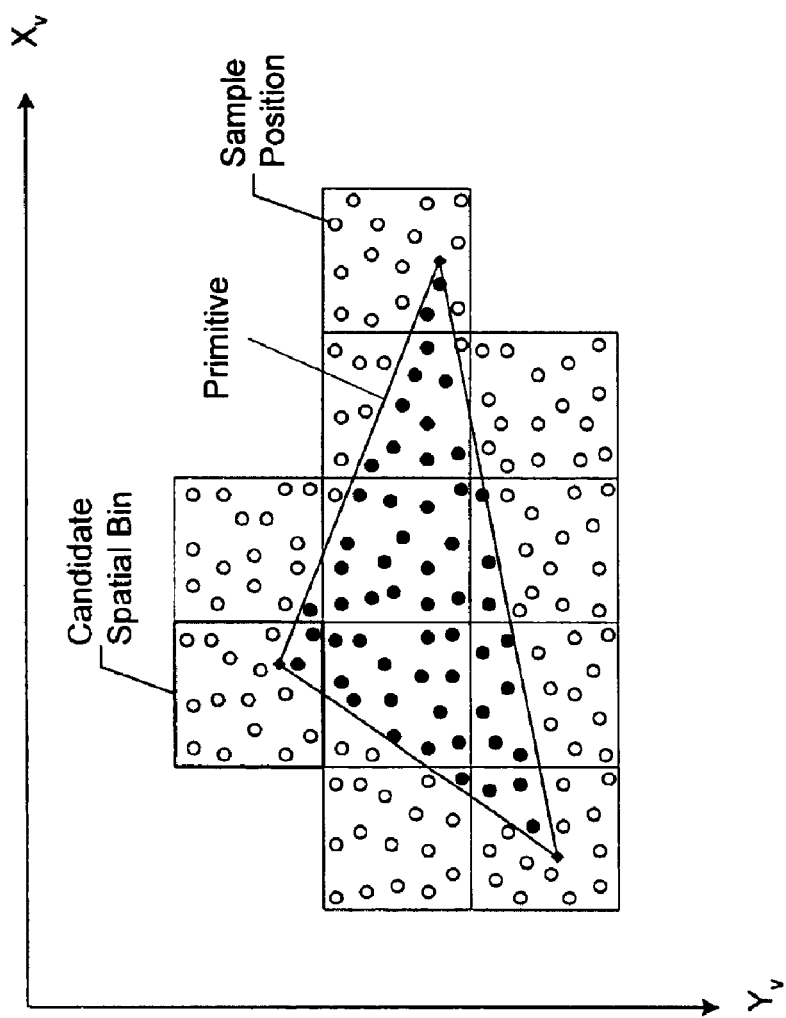
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
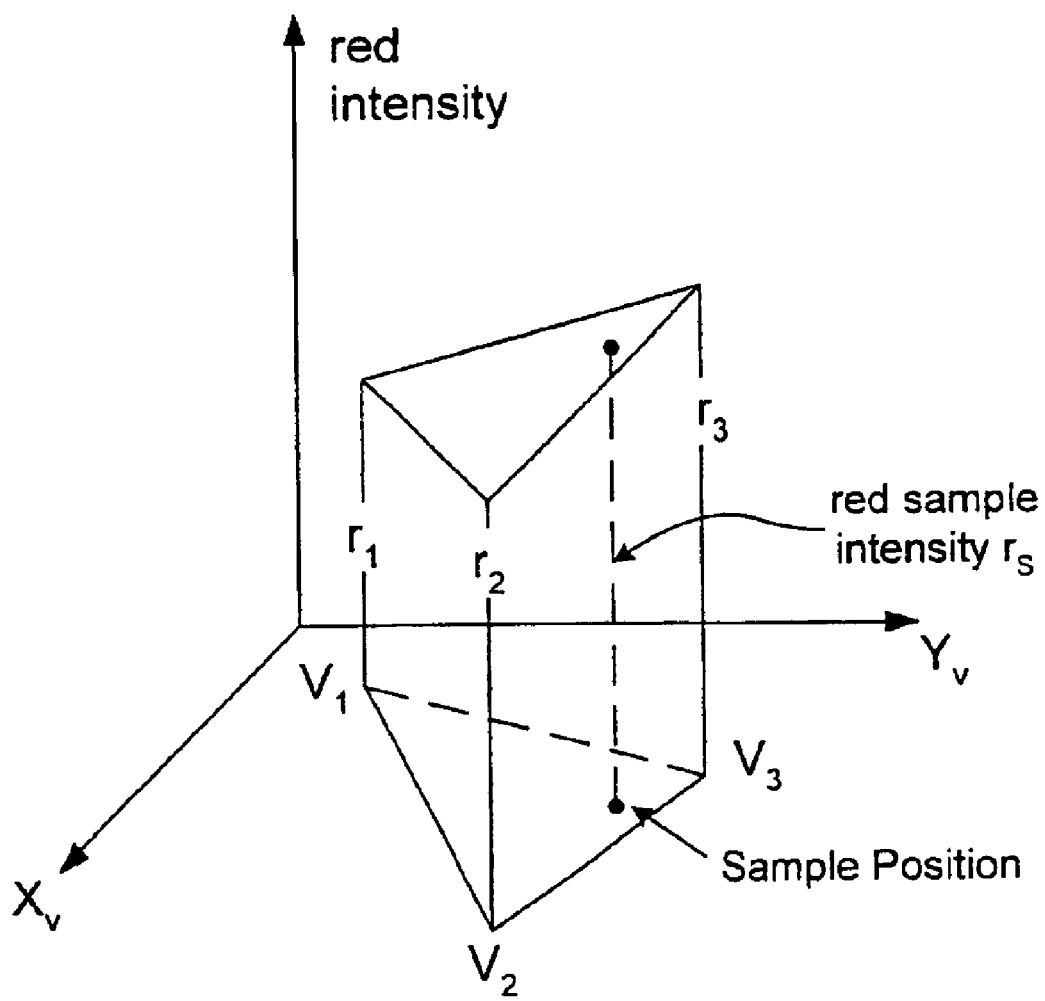
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value $r_s$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765 rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500 and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
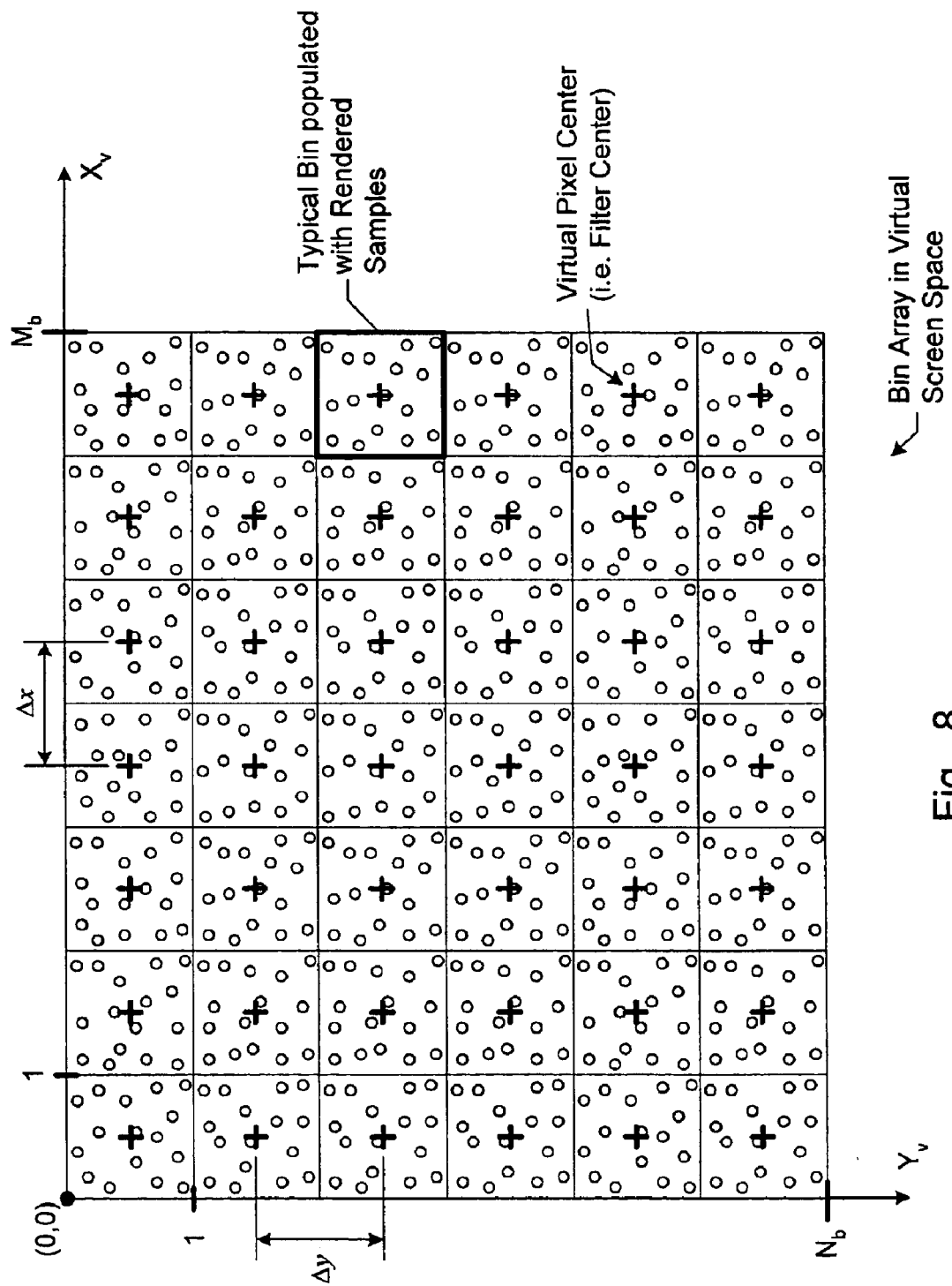
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement $\Delta x$ and vertical displacement $\Delta y$ may be assigned values greater than or less than one. Furthermore, the start position $(X_{start}, Y_{start})$ is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
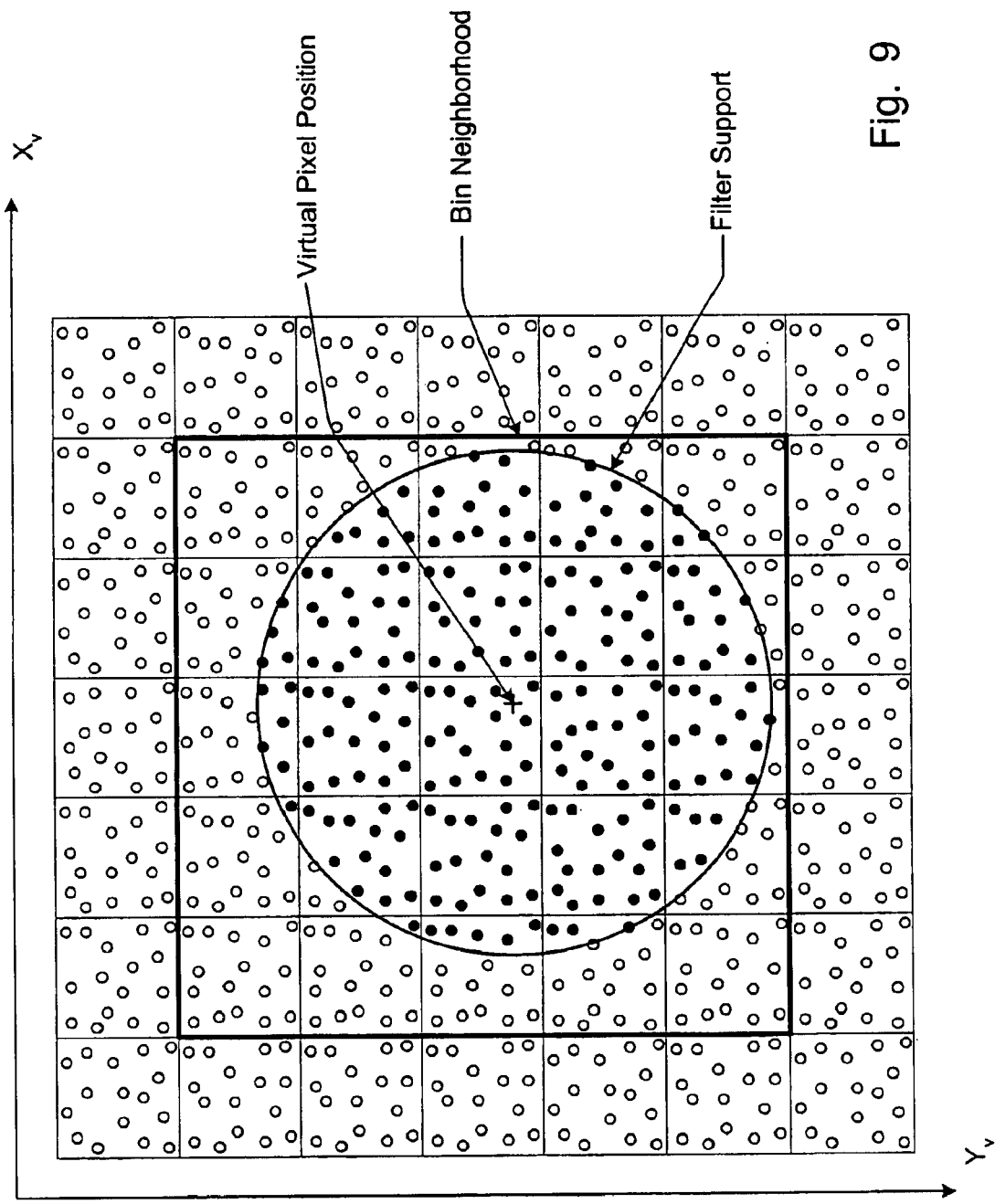
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \Sigma C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \Sigma C_S.$$

The initial pixel values may then be multiplied by the reciprocal of E (or equivalently, divided by E) to determine normalized pixel values:

$$R_P = (1/E)^* r_P$$

$$G_P = (1/E)^* g_P$$

$$B_P = (1/E)^* b_P$$

$$A_P = (1/E)^* \alpha_P$$

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D_S)^2$ of each sample position $(X_S, Y_S)$ in the bin neighborhood with respect to the virtual pixel position $(X_P, Y_P)$ according to the expression $$(D_S) = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_S = (D_S)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P + R_f$, $X_P - R_f$, $Y_P + R_f$, and $Y_P - R_f$. Each sample S in the bin neighborhood may be marked as being valid if the sample's position $(X_S, Y_S)$ falls within the support square, i.e., if $$X_P - R_f < X_S < X_P + R_f \text{ and}$$

$$Y_P - R_f < Y_S < Y_P + R_f.$$

Otherwise the sample S may be marked as invalid. Each valid sample may be assigned the same filter weight value (e.g., $C_S = 1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), . . . , FU($N_f$-1) operating in parallel, where the number $N_f$ of filtering units is a positive integer. For example, in one embodiment, $N_f = 4$. In another embodiment, $N_f = 8$.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f = 4$ case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f = 4$) with equal width, $M_H(K)$ may be set equal to $M_P/4$ for K=0, 1, 2, 3. Filtering unit FU(K) may generate a stripe of pixels in a scan line fashion as follows:

```
I=0;
J=0;
X_P=X_start(K);
Y_P=Y_start(K);
while (J<N_P) {
    while (I < M_H(K) {
        PixelValues = Filtration(X_P,Y_P);
```

-continued

```
        Send PixelValues to Output Buffer;
        X_P = X_P+ΔX(K);
        I = I + 1;
        }
    X_P=X_start(K)
    Y_P=Y_P+ΔY(K);
    J=J+1;
    }
```

The expression Filtration($X_P,Y_P$) represents the filtration of samples in the filter support region of the current virtual pixel position ($X_P,Y_P$) to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
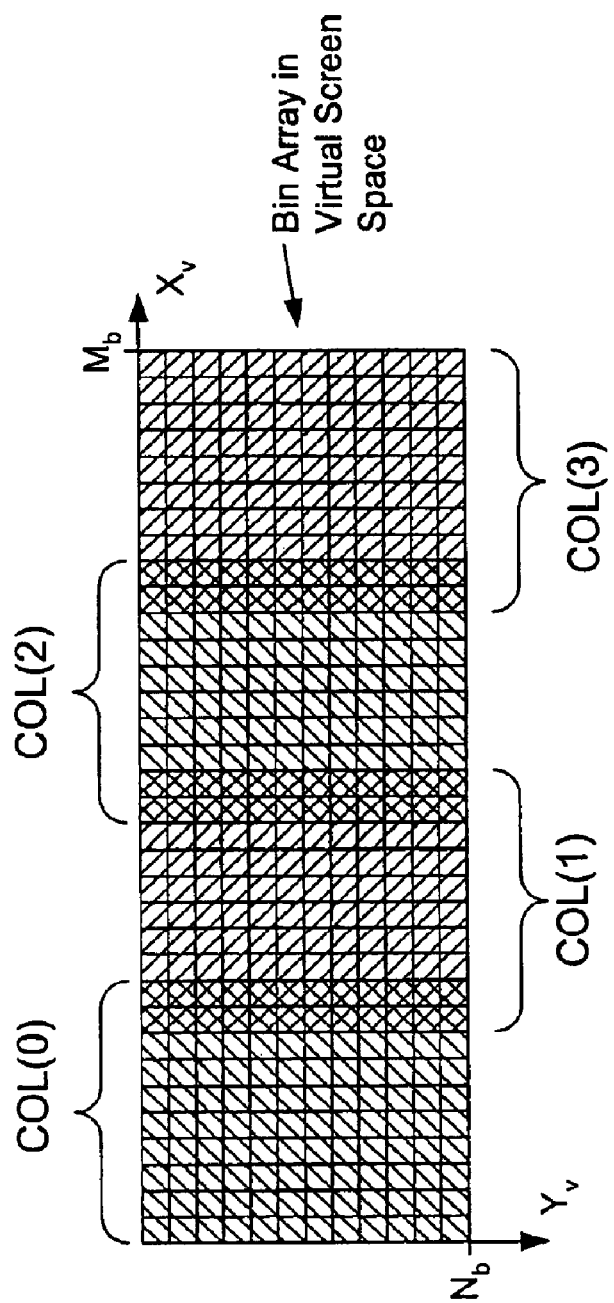
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
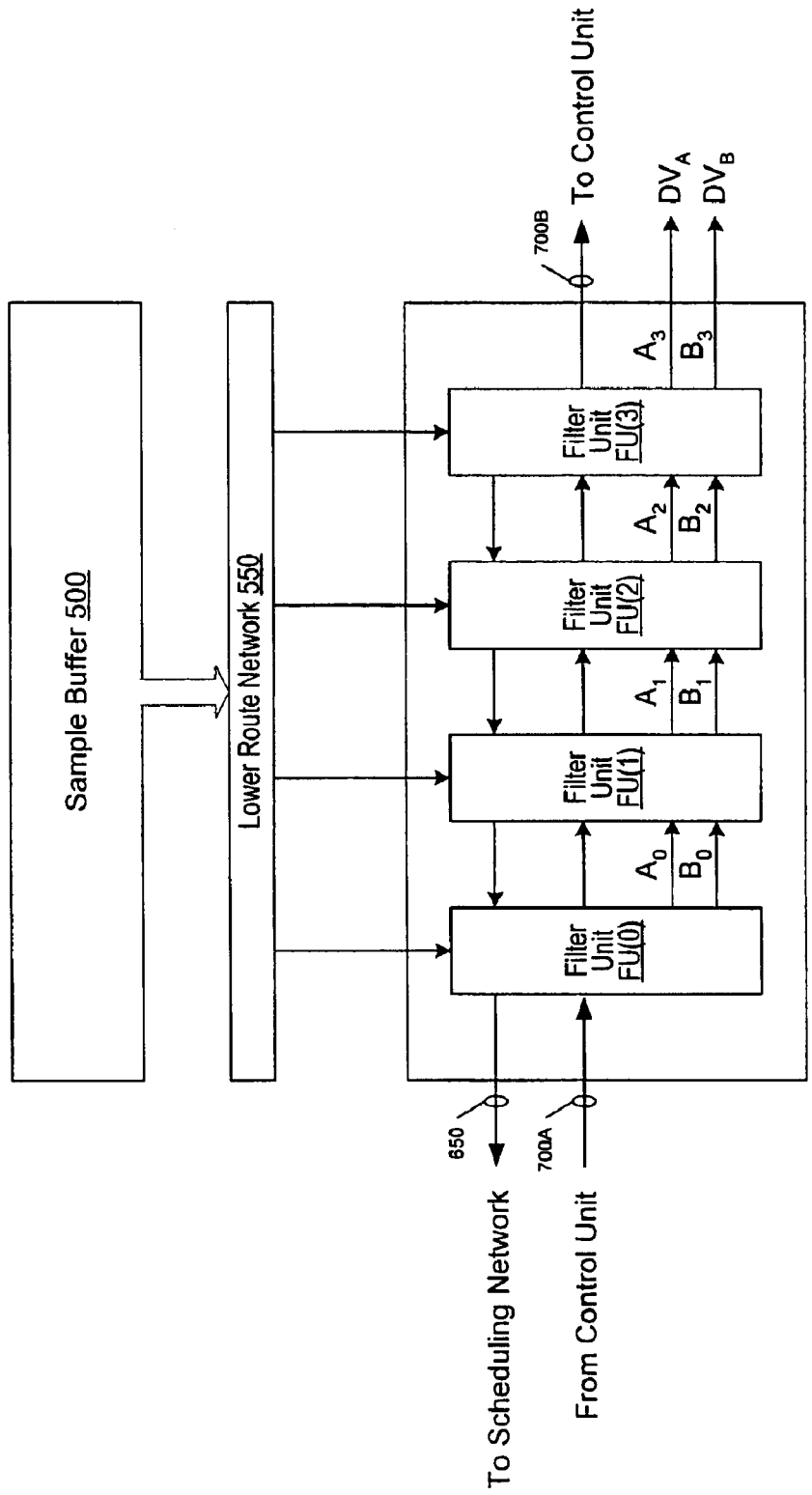
FIG. 11 illustrates one set of embodiments of filtering engine 600.

The filtering units may be coupled together in a linear succession as suggested by FIG. 11 in the case $N_f=4$. Except for the first filtering unit FU(0) and the last filtering unit FU($N_f$-1), each filtering unit FU(K) may be configured to receive digital video input streams $A_{K-1}$ and $B_{K-1}$ from a previous filtering unit FU(K-1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f$-1) receives digital video streams $A_{Nf-2}$ and $B_{Nf-2}$ from the previous filtering unit FU($N_{f-2}$), and generates digital video output streams $A_{Nf-1}$ and $B_{Nf-1}$ also referred to as video streams $DV_A$ and $DV_B$ respectively. Video streams $A_0, A_1, \ldots, A_{Nf-1}$ are said to belong to video stream A. Similarly, video streams $B_0, B_1, \ldots, B_{Nf-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream $A_K$ is transmitted to the next filtering unit. The first filtering unit FU(0) may generate video streams $A_{-1}$ and $B_{-1}$ containing dummy pixels (e.g., pixels having a background color), and mix (or substitute) its computed pixel values into either video stream $A_{-1}$ or $B_{-1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
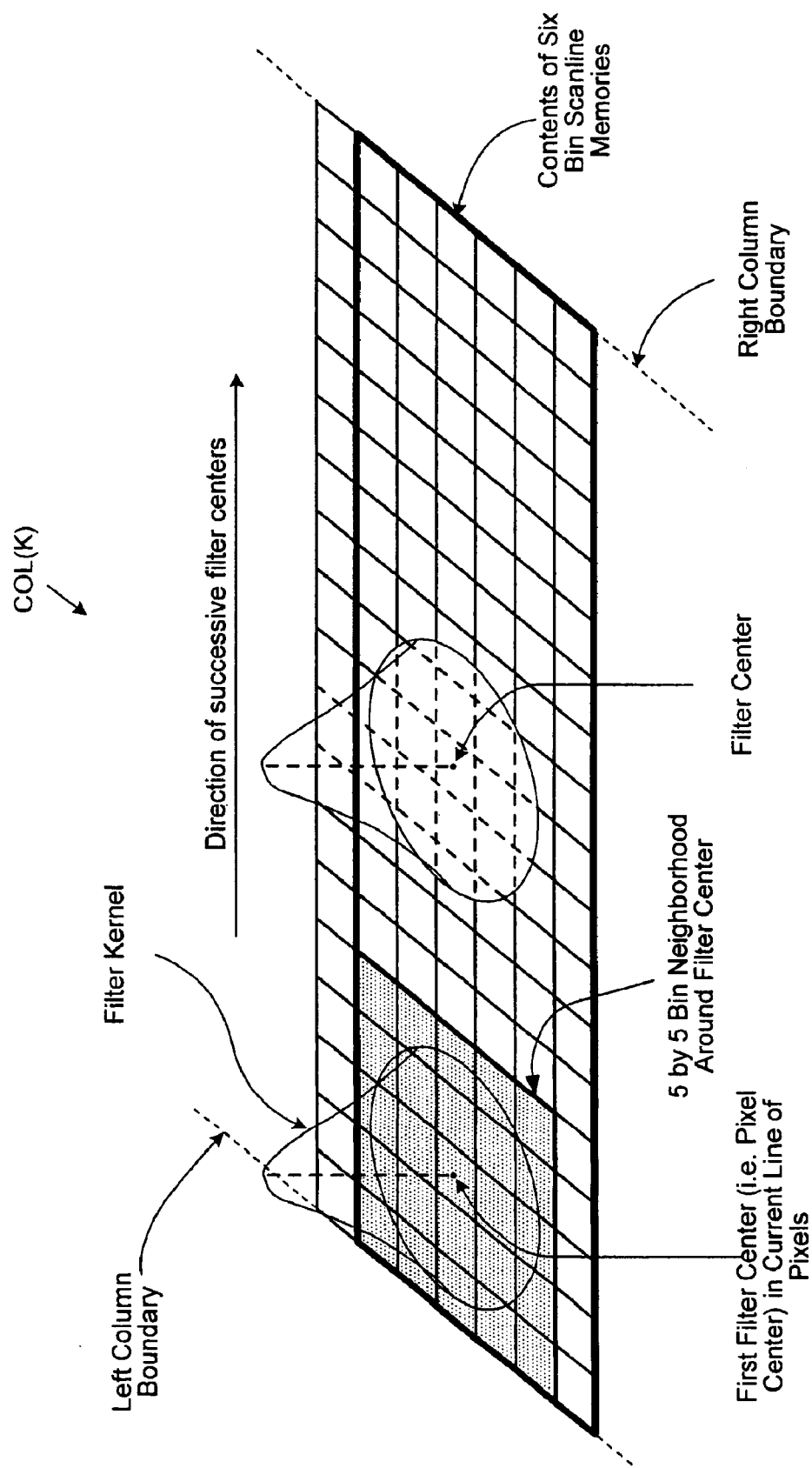
FIG. 12 illustrates one embodiment of a computation of pixels at successive filter centers (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement ($\Delta X,\Delta Y$) to the vector position ($X_{bin},Y_{bin}$) of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements ($\Delta X, \Delta Y$). The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J = N_J = 2$ and $D_{max} = 16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500 and may filter the samples to generate pixels. Each filtering unit may include a copy of the jitter table and permutation circuit, and thus, may reconstruct the sample positions for the samples it receives from the sample buffer 500 i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into $N_{MB}$ memory banks denoted MB(0), MB(1), MB(2), . . . , MB($N_{MB}$-1), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer),
30 bits of sample color (for back buffer),
16 bits of alpha and/or overlay,
10 bits of window ID,
26 bits of z depth, and
4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
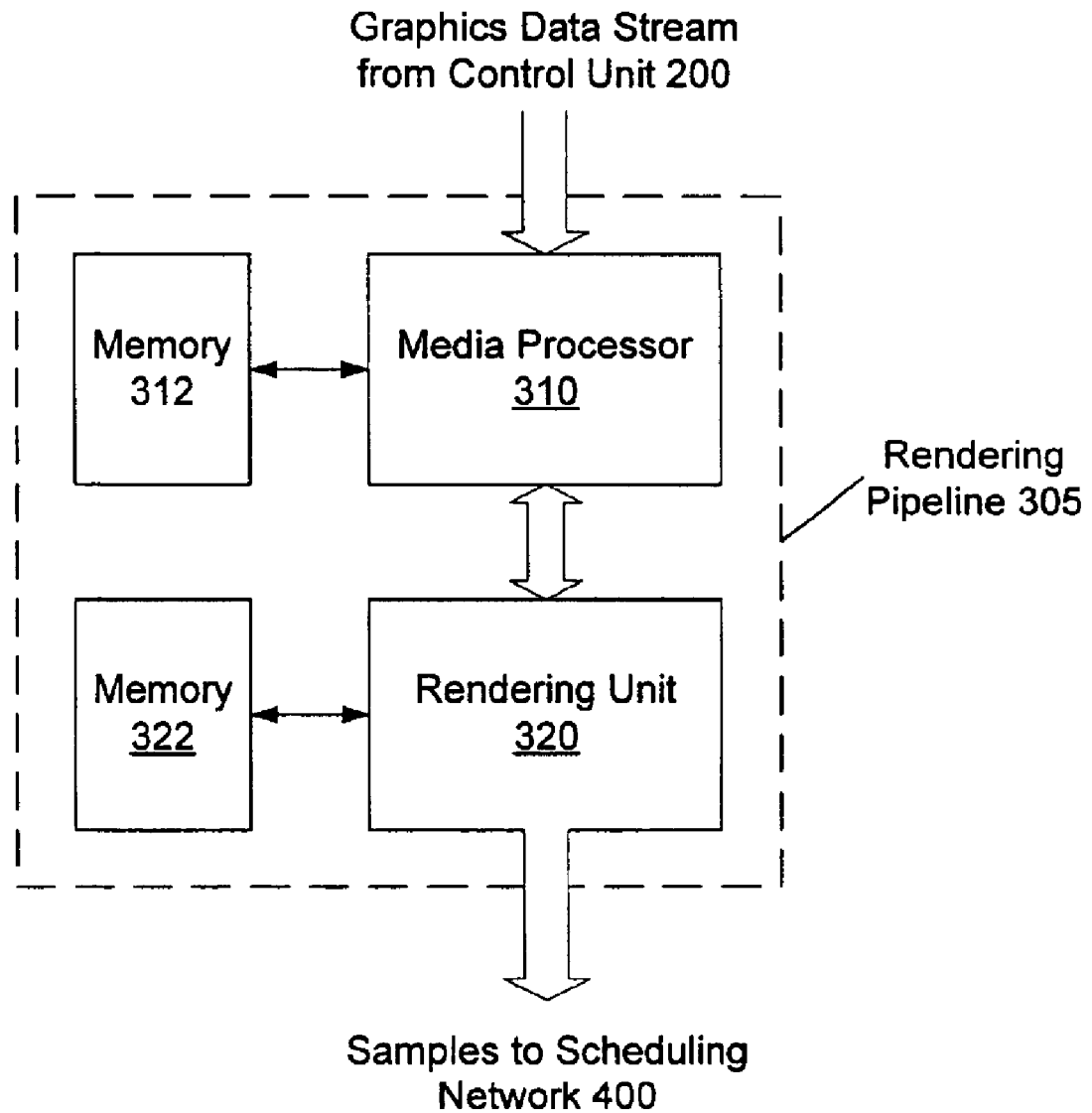
FIG. 13 illustrates one set of embodiments of a rendering pipeline comprising a media processor and a rendering unit.

As described above, the rendering engine 300 may include a set of rendering pipelines RP(0), RP(1), . . . , RP($N_{PL}$-1). FIG. 13 illustrates one embodiment of a rendering pipeline 305 that may be used to implement each of the rendering pipelines RP(0), RP(1), . . . , RP($N_{PL}$-1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
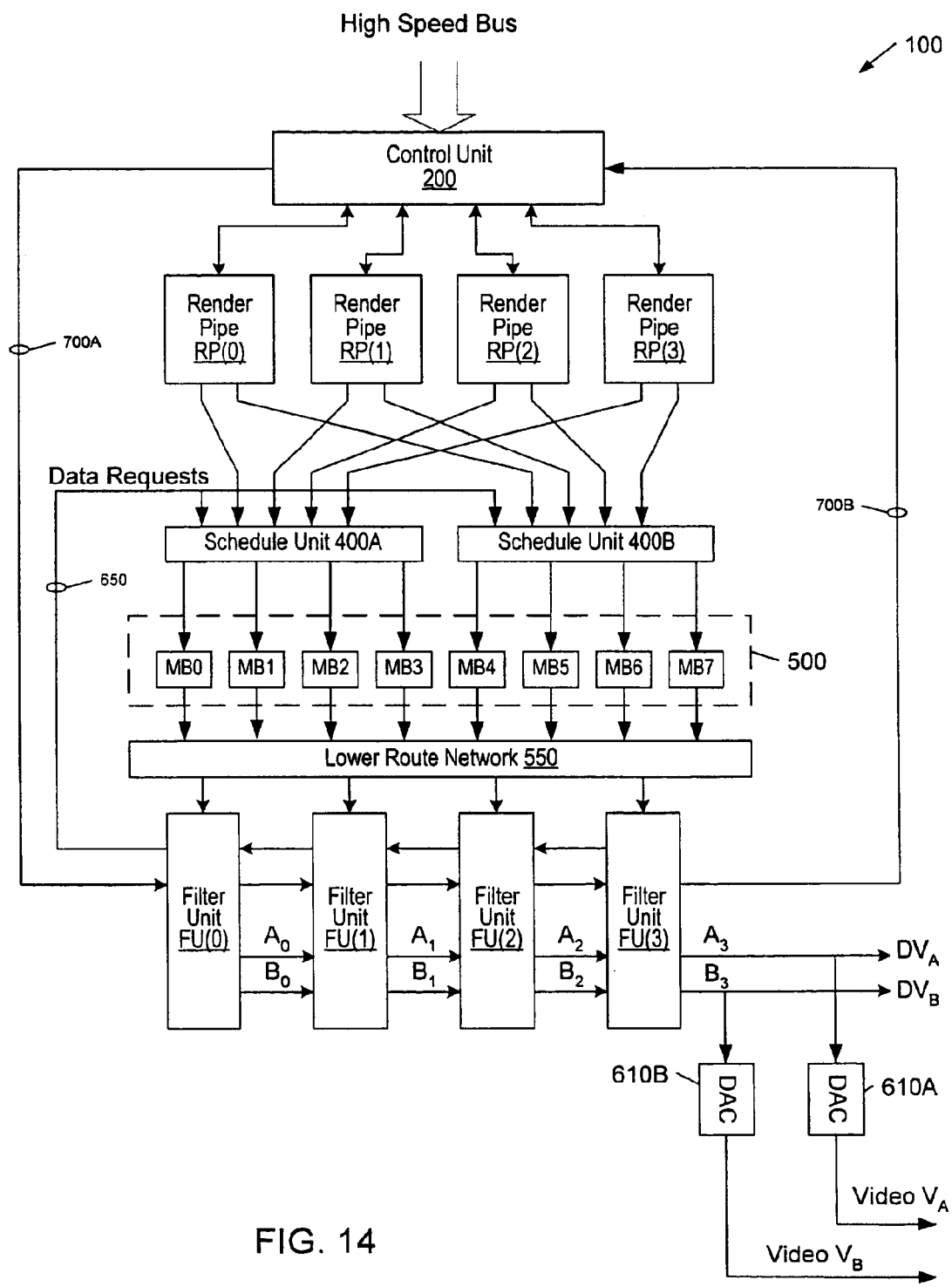
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
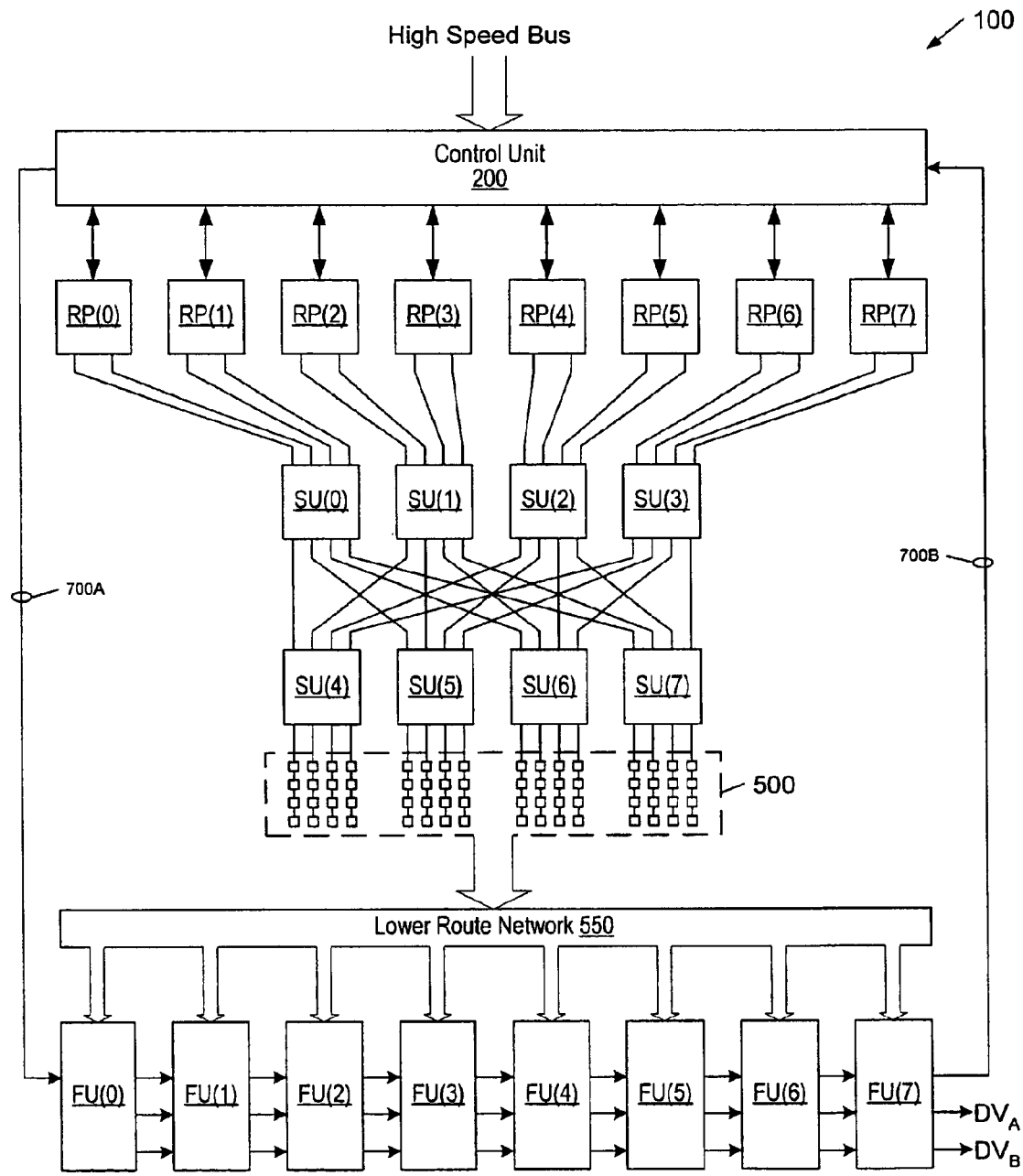
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

It is noted that FIGS. 3, 6, 8 and 9 provide various examples of sample-positioning patterns. These sample-positioning patterns assist in conveying the notion that sample positions may be distributed in a stochastic fashion in sample space. However, these sample position patterns do not necessarily represent examples of patterns generated by the tile permutation methodologies described herein and especially below.

Permuted 2-D Sample Location Pattern

FIGS. 16 through 23 provide details for various embodiments of a system and method for creating a reproducible set of k sample locations for each sample bin in sample space by permuting an n×n array of sample bins. A set of $n^2k$ pre-selected sample locations may be stored in the n×n array of sample bins. Sample space may be defined by the locations of an M×N array of sample bins that are used to store sample values rendered for a graphics image. (M, N, n, and k are positive integers.)

Figure 16:
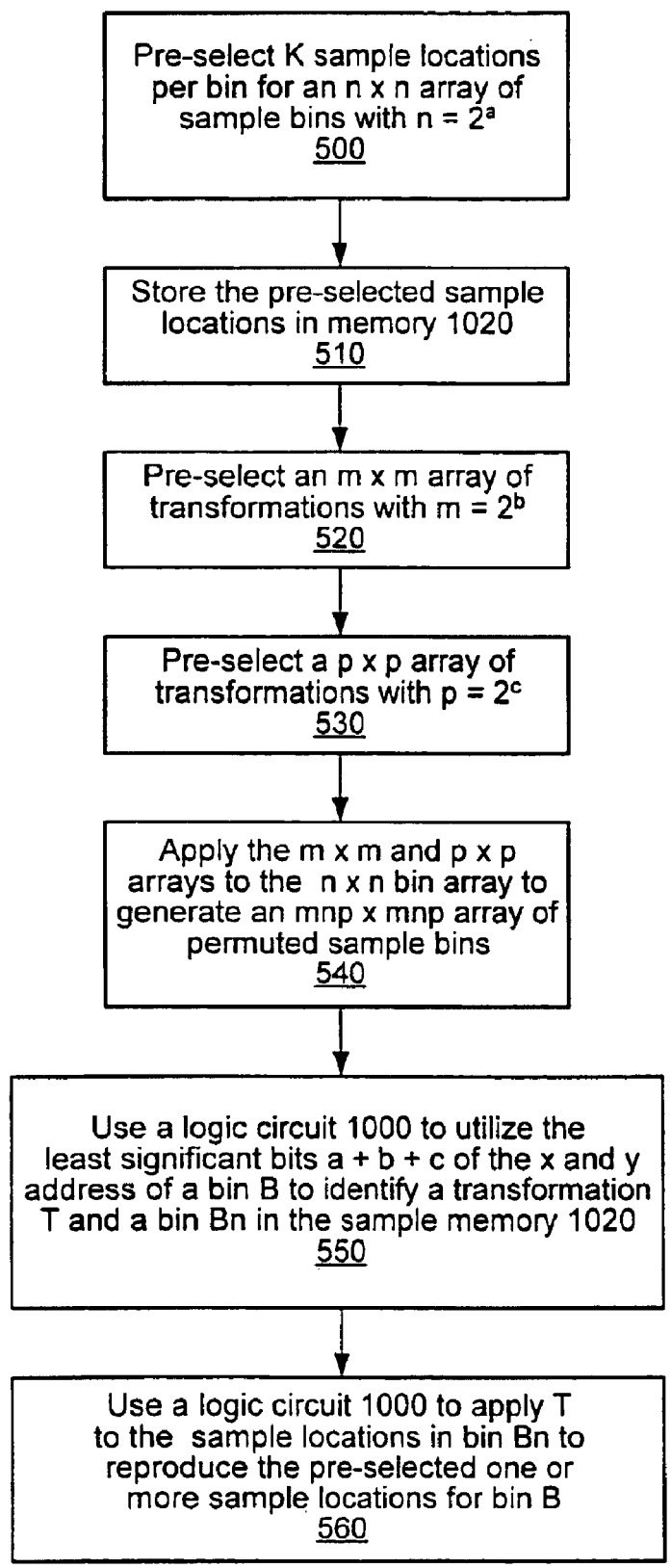
FIG. 16 is a flow chart of a set of embodiments of a method for reproducing pre-selected sample locations.
Figures 17A, 17B:
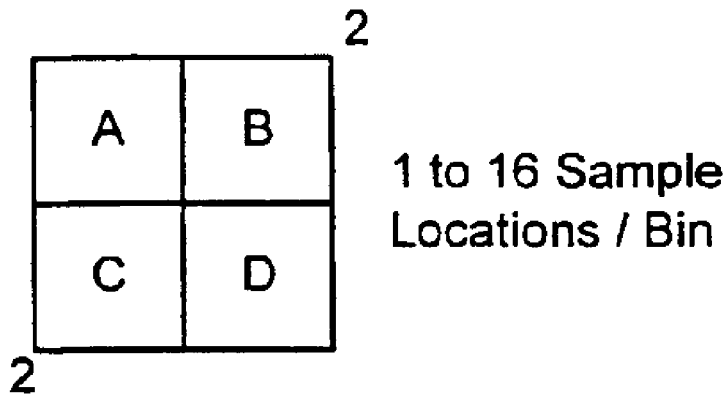
FIG. 17a illustrates a 2×2 sample bin array.
FIG. 17b is a table of 2-D transformations.

FIG. 16 provides a flowchart for a method of pre-selecting a sample location pattern and for reproducing the pre-selected pattern. Specific sample locations are selected for each sample bin of the n×n array of sample bins (step 500). Each sample bin may be assigned k sample locations. In some embodiments, n may be a power of 2 (so that $n=2^a$ and "a" is a positive integer). k may be programmable or specified by a user, and in one embodiment may be preset to any integer from 1 to 16. FIG. 17a illustrates the embodiment with n=2. The sample positions may be chosen to span the sample space within the n×n array of sample bins in a manner that may reduce aliasing effects and artifacts in a graphics image (that may be noticeable to human perception) when the n×n array is permuted and/or tiled to fill the M×N array of sample bins.

The $n^2k$ sample positions selected for the n×n array of sample bins may be stored in a memory 1020 (also referred to as a sample location memory, a sample location RAM, or a sample location cache) (step 510).

Figure 18:
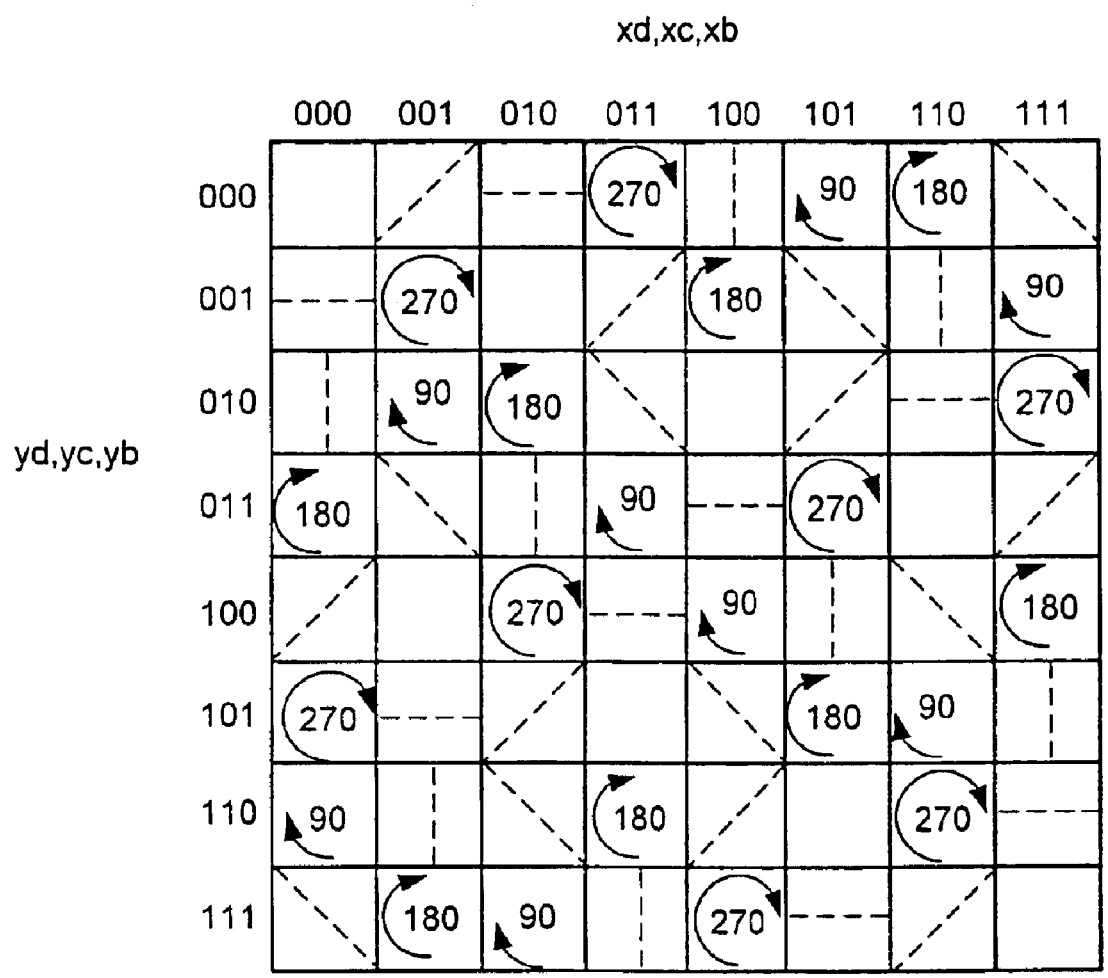
FIG. 18 illustrates one embodiment of an inner transformation array.
Figure 19:
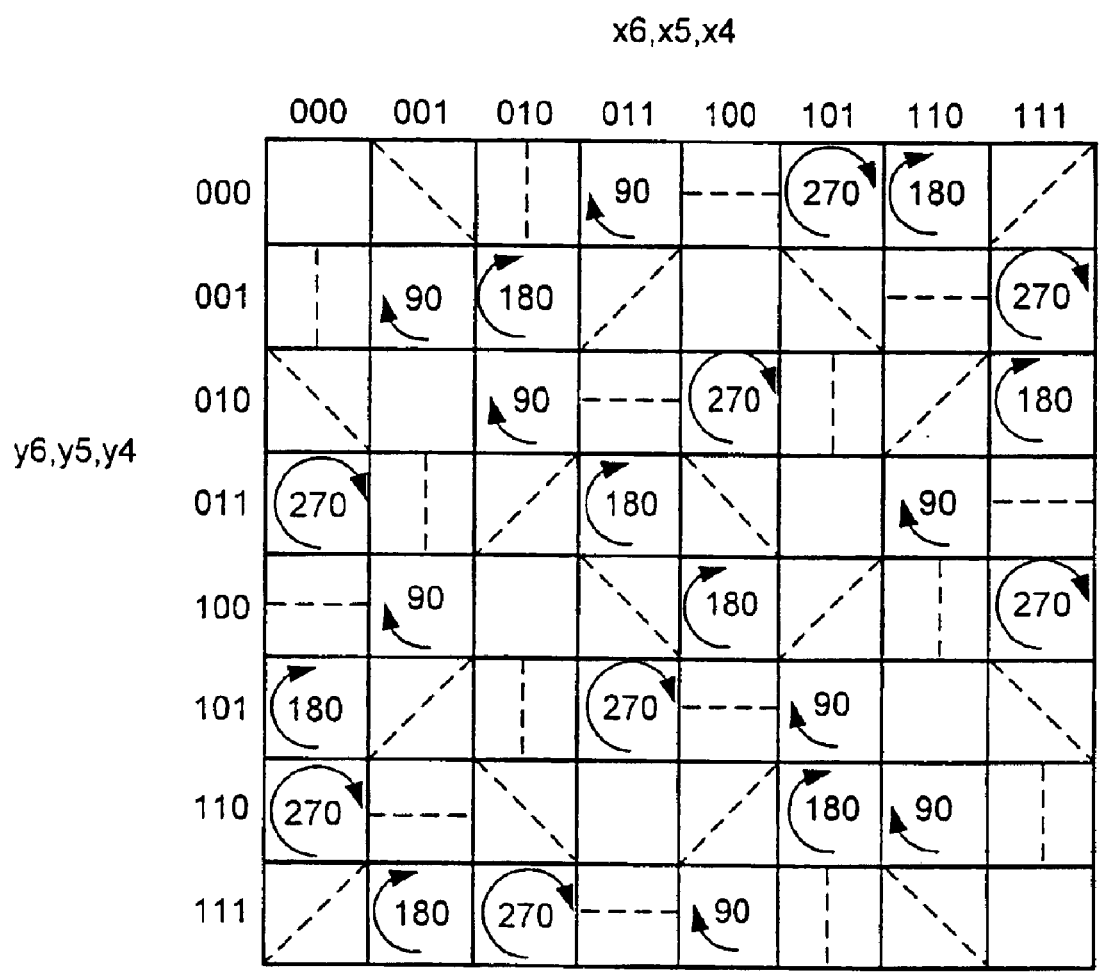
FIG. 19 illustrates one embodiment of an outer transformation array.

An m×m array of 2-D transformations may be selected from the 8 transformations listed in FIG. 17b (step 520) (m is a positive integer and in some embodiments m may be a power of 2, so that $m=2^b$, and b is a positive integer). Sequential applications of 2 or more of these transformations will have the same effect as a specific one of the 8 transformations. Two examples of m×m arrays of 2-D transformations are illustrated in FIGS. 18 and 19 for m=8.

In some embodiments, a second p×p array of 2-D transformations may be selected from the 8 transformations listed in FIG. 17b (step 530). By applying the transformation specified at each position of the m×m array to the n×n array of sample bins, an nm×nm array of sample bins may be populated with sample locations. By applying the transformation specified at each position in the p×p array to the mn×mn array of sample bins, an mnp×mnp array of sample bins may be populated with sample locations (step 540).

In some embodiments, an additional array of 2-D transformations may be used to further increase the size of the sample bin array populated with permuted sets of the n×n array of sample bins. In some embodiments, the n×n array, the nm×nm array, or the mnp×mnp array of sample bins may be tiled across the available sample space.

In some embodiments, a logic circuit 1000 (FIG. 22) may be used to reproduce sample locations for a sample bin B at (x,y) in sample space according to the one or more pre-selected transformation arrays applied to the pre-selected sample locations stored in the n×n array of sample bins (steps 550 and 560). In embodiments with one transformation array, the logic circuit splits both the x and y location of sample bin B into the "a" least significant bits and the next "b" more significant bits and ignores the bits remaining in the location of sample bin B. The logic circuit in these embodiments, may be configured to use the "b" bits for both the x and y location to identify a specific transformation T from the m×m array of transformations that corresponds to the location of sample bin B and to apply the inverse of the transformation T to the "a" bits for both the x and y location to specify sample bin Bn from the n×n sample bin array that corresponds to the location of sample bin B, and then reproduce one or more pre-selected sample positions for sample bin B by applying the specific transformation T to a first one or more of the k sample positions stored in the memory for the specific sample bin Bn.

Figure 20A:
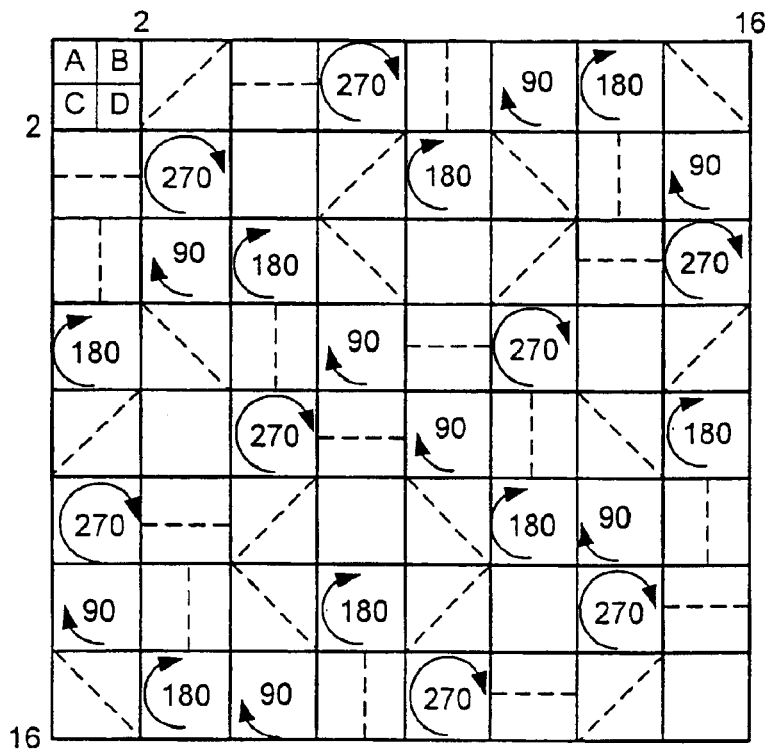
FIG. 20a illustrates one embodiment of an inner bin array.
Figure 20B:
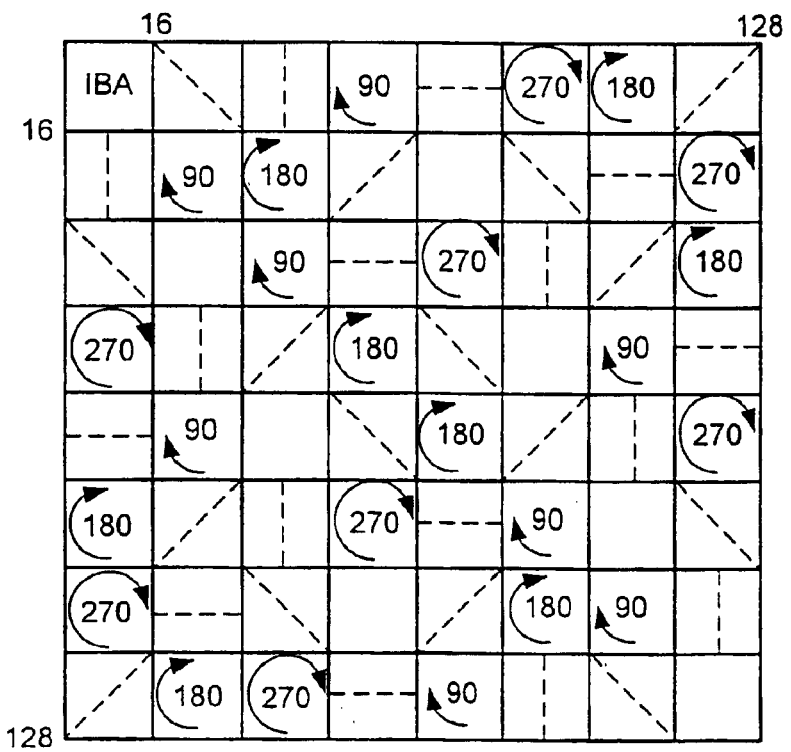
FIG. 20b illustrates one embodiment of an outer bin array.
Figure 20C:
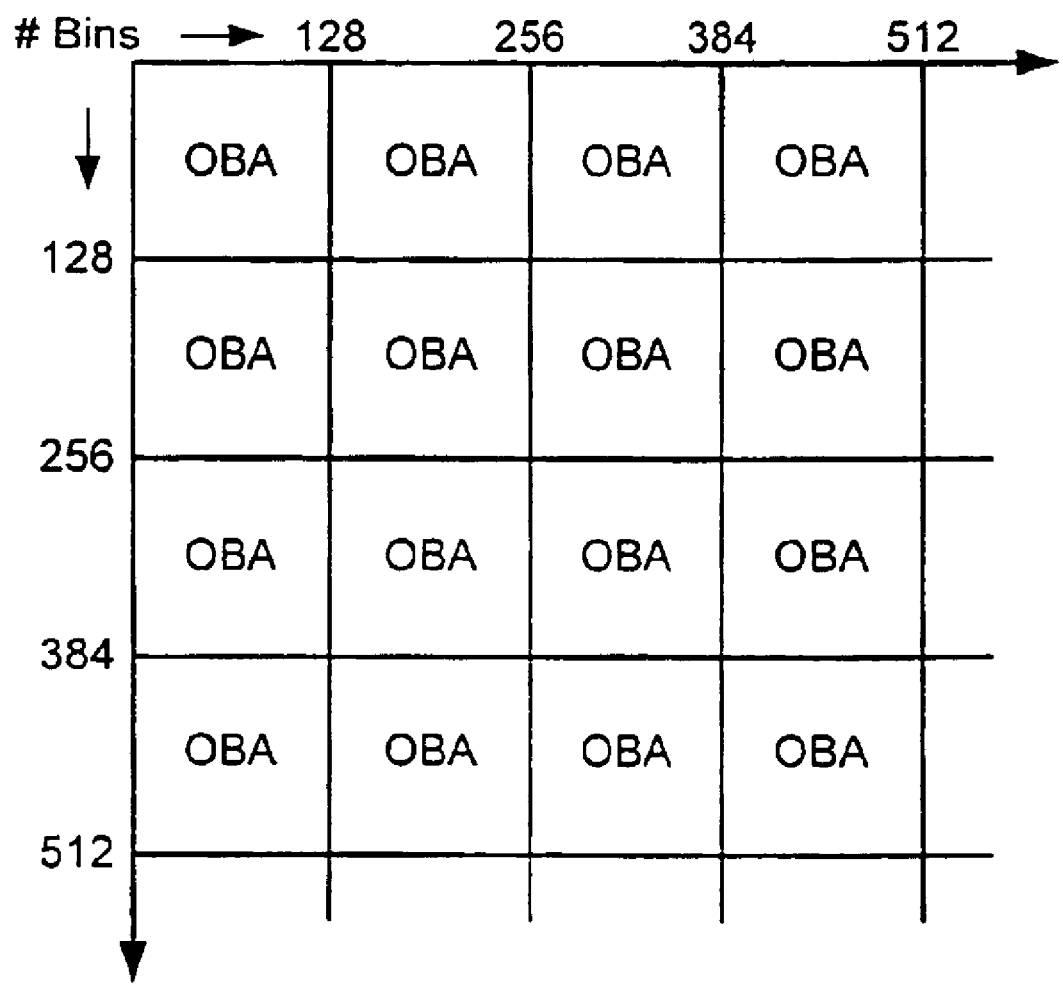
FIG. 20c illustrates tiling an outer bin array to fill available sample space.
Figure 21:
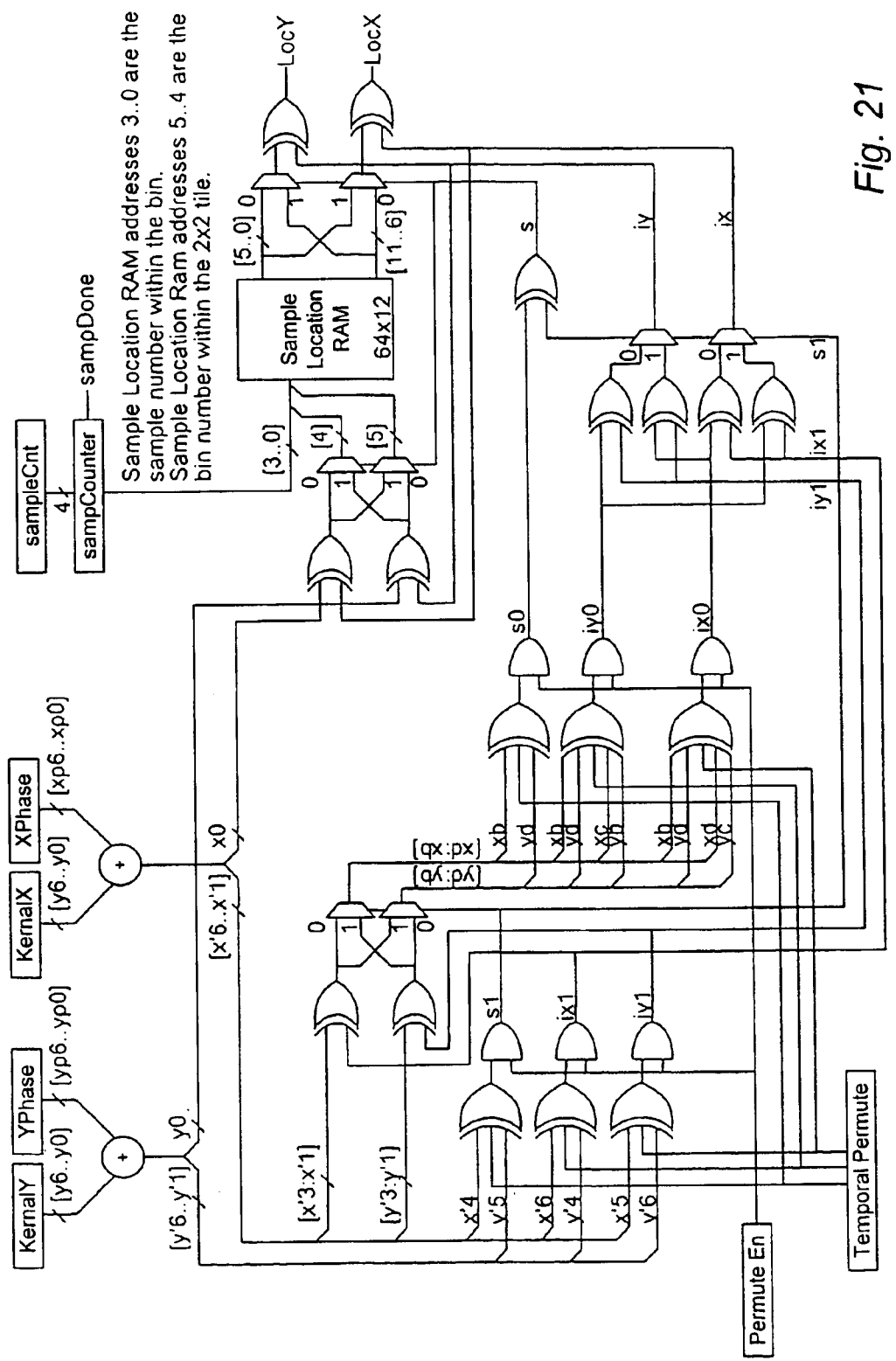
FIG. 21 is a circuit drawing of one embodiment of a permutation logic circuit.

FIGS. 20a, 20b, and 20c illustrate one set of embodiments of a method to reproduce pre-selected sample positions for each sample bin in the available sample space. In these embodiments, an 8×8 array of transformations shown in FIG. 18, called an Inner Transformation Array, may be applied to a 2×2 array of sample bins to obtain the 16×16 array of sample bins shown in FIG. 20a and referred to as an Inner Bin Array. A second 8×8 array of transformations shown in FIG. 19, called an Outer Transformation Array, may be applied to the Inner Bin Array to obtain the 128×128 Outer Bin Array shown in FIG. 20b. The Outer Bin Array is then tiled across sample space as illustrated in FIG. 20c. A logic circuit of the type that may be used to reproduce pre-selected sample locations for a sample bin B with this method is shown in FIG. 21.

The Outer Transformation Array may selected to be different from the Inner Transformation Array in order to avoid self similarity, and thereby, create more apparent randomness, in the induced sample positioning pattern.

Figure 22:
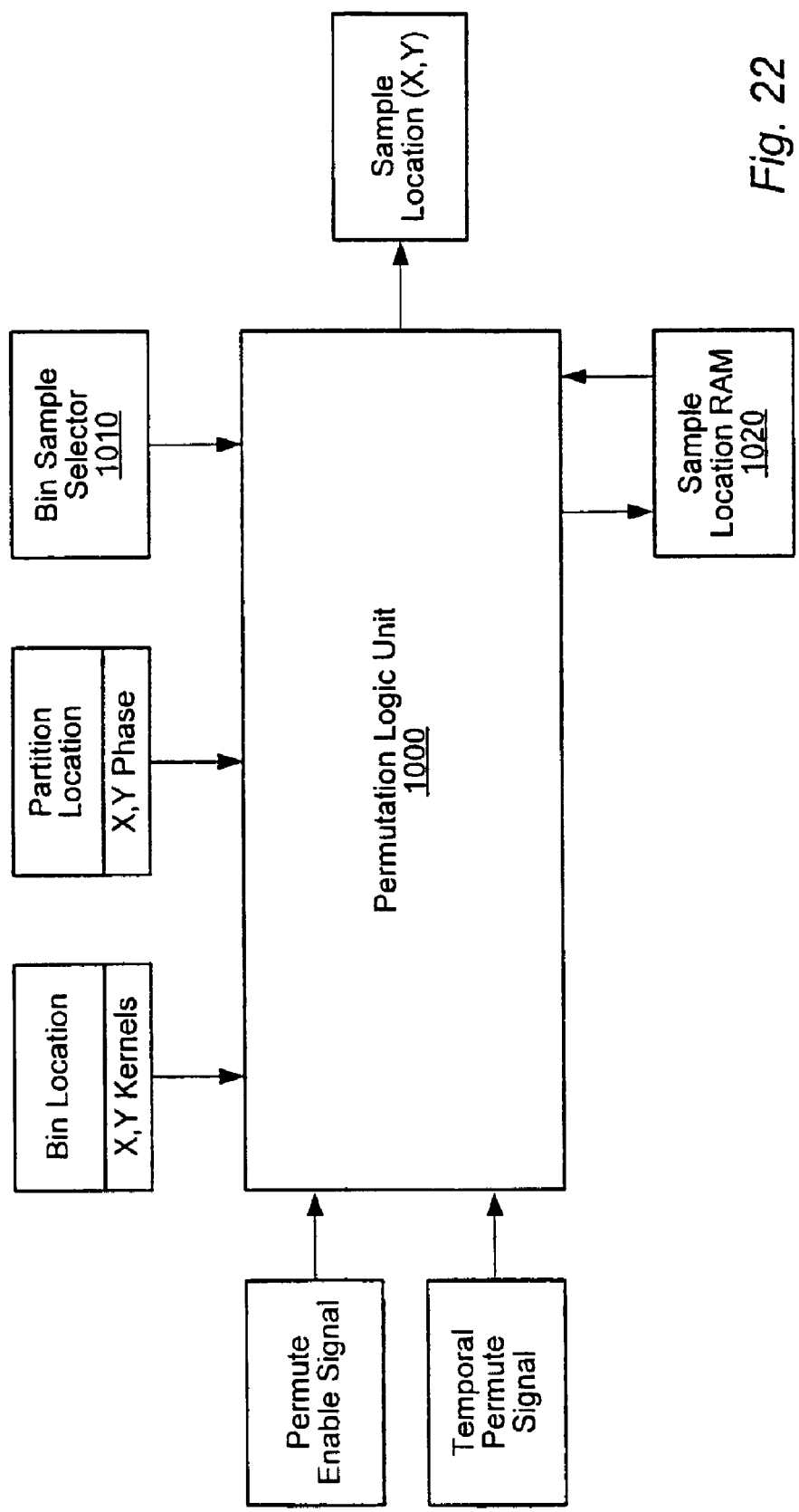
FIG. 22 is a block diagram of a set of embodiments of a system for reproducing pre-selected sample locations.

FIG. 22 is a simplified block diagram illustrating a system for reproducing pre-selected sample locations for a specific sample bin in sample space. A permutation logic unit 1000, may be connected to one or more devices including, but not limited to, a host computer, a graphics accelerator, a rendering unit, a filtering unit, a sample location memory 1020, and a bin sample selector 1010. The sample location memory 1020 may be configured to store k pre-selected sample locations for each bin in an n×n array of sample bins, where k is a positive integer. Sample location memory 1020 may be an external memory, a memory cache integrated into the logic unit 1000, a series of registers, or other semiconductor memory device.

The permutation logic unit 1000 may be configured to receive the X and Y kernels of a sample bin location (X,Y). The kernels may be a specific number of the least significant bits of X and Y that will be used by the permutation logic unit 1000. The discarding of the more significant bits implies a tiling of the permuted bins. Therefore, the discarded bits do not affect the sample locations generated.

The bin sample selector 1010 may be configured to sequence the permutation logic unit 1000 through the sample locations stored in a sample bin in the sample location memory 1020. The bin sample selector 1010 also may limit the number of sample positions generated to a specified value that may be supplied by a user, or by one of the devices connected to the permutation logic unit 1000.

In some embodiments, the permutation logic unit 1000 may be configured to respond to a permute enable signal. This signal may turn off the permutation identification logic and effectively tile the n×n sample bin array across available sample space.

In other embodiments, the permutation logic unit 1000 may be configured to respond to a temporal permute signal. This signal may consist of a repeating sequence of signals of j bits (j is a positive integer). The sequence may have one or more members. The temporal permute signal may scramble the transformations selected by the permutation logic unit 1000 in a repeating sequence at a selected frequency. FIG. 21 illustrates one embodiment for j=3.

Figure 23:
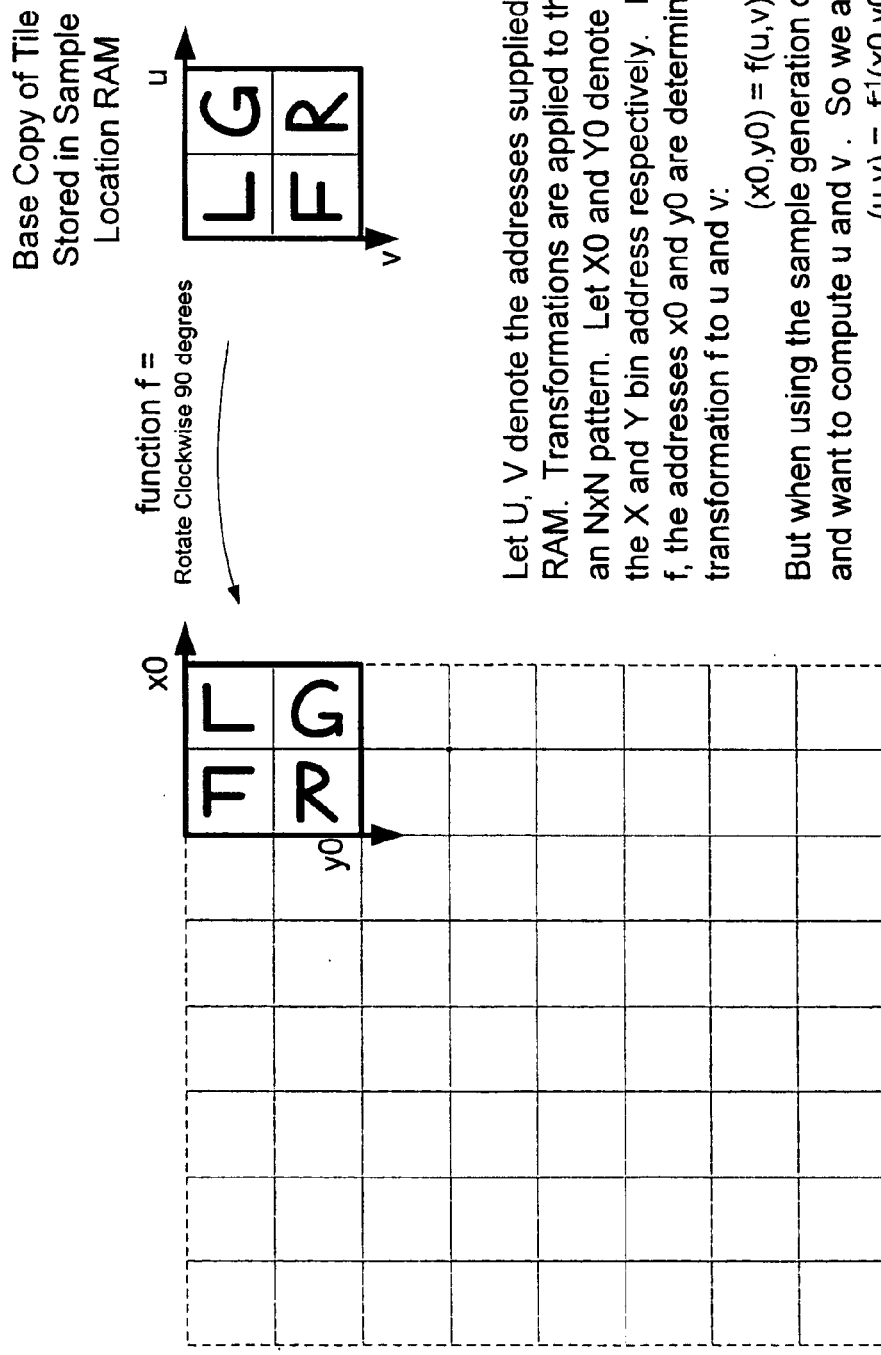
FIG. 23 illustrates the need for an inverse transformation.

FIG. 23 provides an explanation of the logic of applying the inverse of transformation T to the "a" address bits of bin B in order to obtain the address of a corresponding bin Bn in the n×n sample bin array. The methodology described above of applying to the "a" address bits the inverse of a transformation T defined by the "b" address bits, and applying the transformation T to the sample positions (or deltas) emerging from the selected bin of the sample location RAM, ensures that the n×n array of bins stored in the sample location RAM is transformed as a rigid object (i.e., no internal rearrangement of bins as the n×n array is transformed).

Figure 24:
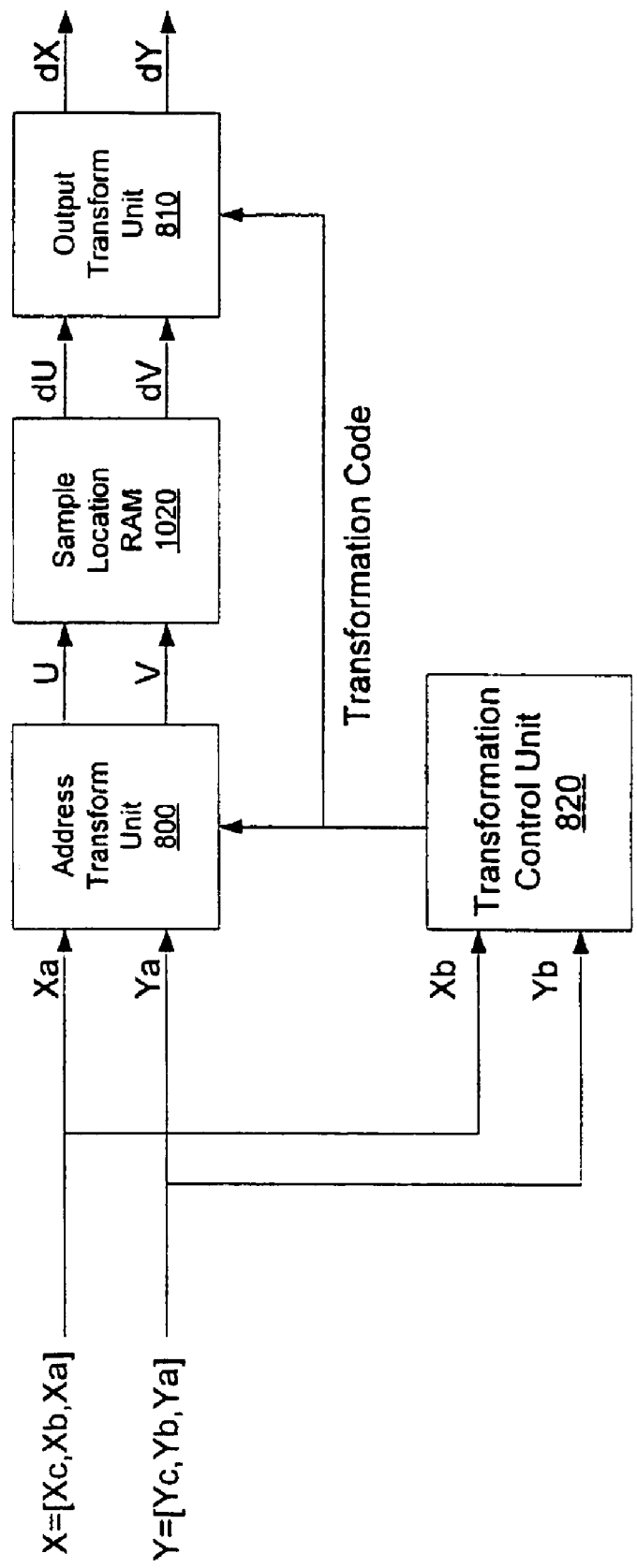
FIG. 24 illustrates another set of embodiments of a system for reproducing pre-selected sample locations.

FIG. 24 provides a block diagram of another set of embodiments for a system and method for reproducing, for a specific sample bin in sample space, a pre-selected permutation of a pre-selected set of sample locations for a corresponding sample bin of an n×n sample bin array (also referred to as a tile or a tile of bins). In these embodiments, the system for reproducing sample locations for a specific sample bin includes an input port for receiving a two-dimensional address that specifies a location of a sample bin, a sample location memory 1020 configured to store the pre-selected sample locations for the tile of bins, an address transform unit (also referred to as a pre-transformation unit) 800, an output transform unit (also referred to as a post-transformation unit) 810, and a transformation control unit 820, configured to receive a first portion (Xb and Yb) of the two-dimensional bin address, and to determine a transformation code for a first transformation T based on the first portion.

The address transform unit 800 may be configured to apply an inverse of the first transformation T to a second portion (Xa and Ya) of the two-dimensional bin address in response to receiving the transformation code, thereby generating memory address bits for the corresponding sample bin in the n×n array. The sample location memory 1020 may be configured to output a first set of sample displacements in response to receiving the memory address bits. The output transform unit 810 may be configured to apply the first transformation to the first set of sample displacements in response to receiving the transformation code, thereby generating a second set of sample displacements.

In one set of embodiments, a method for reproducing sample locations for a specific sample bin includes operating on a first portion of a two-dimensional address of the sample bin to determine a first transformation T, applying an inverse of the first transformation T to a second portion of the two-dimensional address of the sample bin to determine a modified two-dimensional address, reading a first set of sample displacements from a sample location memory 1020 using the modified two-dimensional address, applying the first transformation T to the first set of sample displacements to determine a second set of sample displacements, and adding the second set of sample displacements to the two-dimensional address of the sample bin to determine the sample locations of the sample bin.

The first transformation T may be one of a group of eight two-dimensional transformations. The transformation control unit 820 may be configured to implement a pre-selected mapping of each state of the first portion of the two-dimensional address into a corresponding transformation T selected from the group of eight transformations (see FIG. 17b).

In some embodiments, the transformation control unit 820 may be a combinational logic network. In other embodiments, the transformation control unit 820 may include a lookup table that stores a transformation code for each state of the first portion of the two-dimensional address. In still other embodiments, the transformation control unit 820 may include a combinational logic network and one or more lookup tables.

The address transform unit 800 may include two multiplexors, a first XOR gate, and a second XOR gate, where a first bit of the transformation code may control the two multiplexors.

The output transform unit 810 may include two multiplexors, a first XOR gate, and a second XOR gate, where a first bit of the transformation code may control the two multiplexors.

This method may be applied to reproduce pre-selected sample locations in a graphics processor when rendering sample values in response to received graphics data. This method may also be applied to reproduce pre-selected sample locations in a filtering unit when reading sample values corresponding to the pre-selected sample locations from a sample buffer, and operating on the sample values and sample locations to determine pixel values.

In other embodiments, a method for reproducing pre-selected sample locations for a sample bin in an array of sample bins, includes a) receiving a first two-dimensional bin address specifying an X bin address and a Y bin address for a location of the sample bin in the array of sample bins, b) operating on a first portion of the first two-dimensional bin address to determine a first transformation T, where the first portion includes a first set of bits in the X bin address and a first set of bits in the Y bin address, c) applying an inverse of the first transformation T to a second two-dimensional address composed of a second set of bits in the X bin address and a second set of bits in the Y bin address to generate a two-dimensional memory address, d) accessing a first set of sample displacements from a sample location memory using the two-dimensional memory address, e) applying the first transformation T to each sample displacement of the first set to generate a second set of sample displacements, and f) adding the second set of sample displacements to the first two-dimensional bin address to determine the sample locations for the sample bin. The sample location memory 1020 may store pre-selected sample location displacements for an n×n array of bins, where n is a positive integer, where the two-dimensional memory address selects one of the bins in the n×n array, and where the first set of sample displacements are accessed from the select bin.

In one alternative set of embodiments, the n×n array of bins may be replaced by an n1×n2 non-square array of bins, where n1 and n2 are positive integers. Note that the group of eight transformations described above includes transformations (such as the +90 or −90 degree rotations) which fail to map a non-square array onto itself. Thus, the transformations to be applied to a non-square array may restricted to the subgroup of four transformations generated by (a) mirroring about x and (b) mirroring about y.

For more description of a system and method for generating sample locations based on a tiling of space with a pattern of spatial transformations, please refer to U.S. patent application Ser. No. 10/387,357, filed on Mar. 12, 2003, entitled "Method of Creating a Larger 2-D Sample Location Pattern from a Smaller One by Means of X,Y Address Permutation", invented by Michael F. Deering, Nathaniel David Naegle and Ranjit S. Oberoi, which is hereby incorporated by reference in its entirety as though fully and completely set forth herein.

Maintaining Continuity of Sample Jitter Pattern Across Clustered Graphics Accelerators In one set of embodiments, a system may be configured to reproduce sample locations conforming to a pattern of transformations spanning a plurality of local coordinate systems, to allow multiple graphics accelerators to compute tiles of a global image, with no filtering artifacts due to sample position pattern discontinuities across the boundaries of neighboring tiles. The system may include a plurality of sample generation circuits (also referred to as sample reproduction circuits). Each sample generation circuit $S_K$ of the plurality of sample generation circuits may include one or more of an adder unit 790, a sample location memory 1020, an address transform unit 800, an output transform unit 810, and a transformation control unit 820 as suggested by FIG. 25. The address transform unit 800 is also referred to as a pre-transformation unit. The output transform unit is also referred to as a post-transformation unit.

In the sample generation circuit $S_K$, the adder unit 790 may receive a two-dimensional bin address (X,Y) specifying a location of a bin in a corresponding local coordinate system $L_K$. The adder unit may also receive a two-dimensional bin offset $(X_{Phase}, Y_{Phase})$ of an origin of the local coordinate system $L_K$ with respect to an origin of a global coordinate system. (The two-dimensional bin offset may be a programmable value provided by host software.) The adder unit may be configured to add the two-dimensional local bin address (X,Y) and the two-dimensional bin offset $(X_{Phase}, Y_{Phase})$ to generate a two-dimensional global bin address (E,F) of the bin with respect to the origin of the global coordinate system:

$E = X + X_{Phase}$ $F = Y + Y_{Phase}.$

The adder unit may include two adders: one adder for the x components and another adder for the y components.

The horizontal component E of the two-dimensional global bin address may be represented as E=[Ec,Eb,Ea], where Ea is a contiguous set of least significant bits in E, Eb is a contiguous set of medium significant bits in E, and Ec is a contiguous set of next more significant bits in E. The sizes of Ea, Eb and Ec may be "a" bits, "b" bits and "c" bits respectively, where "a" and "b" are integers greater than or equal to one, and "c" is an integer greater than or equal to zero. In one embodiment, "a"=1 and "b"=3.

Similarly, the vertical component F of the two-dimensional global bin address may be represented as F=[Fc,Fb,Fa], where Fa is a contiguous set of least significant bits in F, Fb is a contiguous set of medium significant bits in F, and Fc is a contiguous set of next more significant bits in F. The sizes of Fa, Fb and Fc may be "a" bits, "b" bits and "c" bits respectively.

The sample location memory 1020 may be configured to store a pre-selected set of sample displacements for a tile of bins. The tile may be a rectangular array of bins (e.g., a 2×2 array of bins).

The transformation control unit 820 may be configured to receive the subaddress (Eb,Fb) of the two-dimensional global bin address, and to determine a transformation code for a transformation T based on the subaddress (Eb,Fb). The transformation control unit 820 maps each of the $2^{(2b)}$ states of the subaddress to a corresponding transformation in the group of eight transformations designated by FIG. 17b.

The address transform unit 800 may be configured to apply an inverse of the transformation T to the subaddress (Ea,Fa) of the two-dimensional global bin address in response to receiving the transformation code, thereby generating a memory address defining a bin from the tile (stored in sample location memory 1020).

The sample location memory 1020 may be configured to output a sequence of sample displacements in response to receiving the memory address.

The output transform unit 810 may be configured to apply the transformation T to the sequence of sample displacements in response to receiving the transformation code, thereby generating a transformed sequence of sample displacements.

In some embodiments, a plurality of graphics accelerators (such as graphics accelerator 100) may be programmed to collaboratively generate a video stream for a display device. For more information on the collaborative generation of video streams using multiple graphics accelerators, please refer to U.S. patent application Ser. No. 09/894,617 filed on Jun. 27, 2001, entitled "Flexible Video Architecture for Generating Video Streams" which is hereby incorporated by reference in its entirety as though fully and completely set forth herein.

Figure 26:
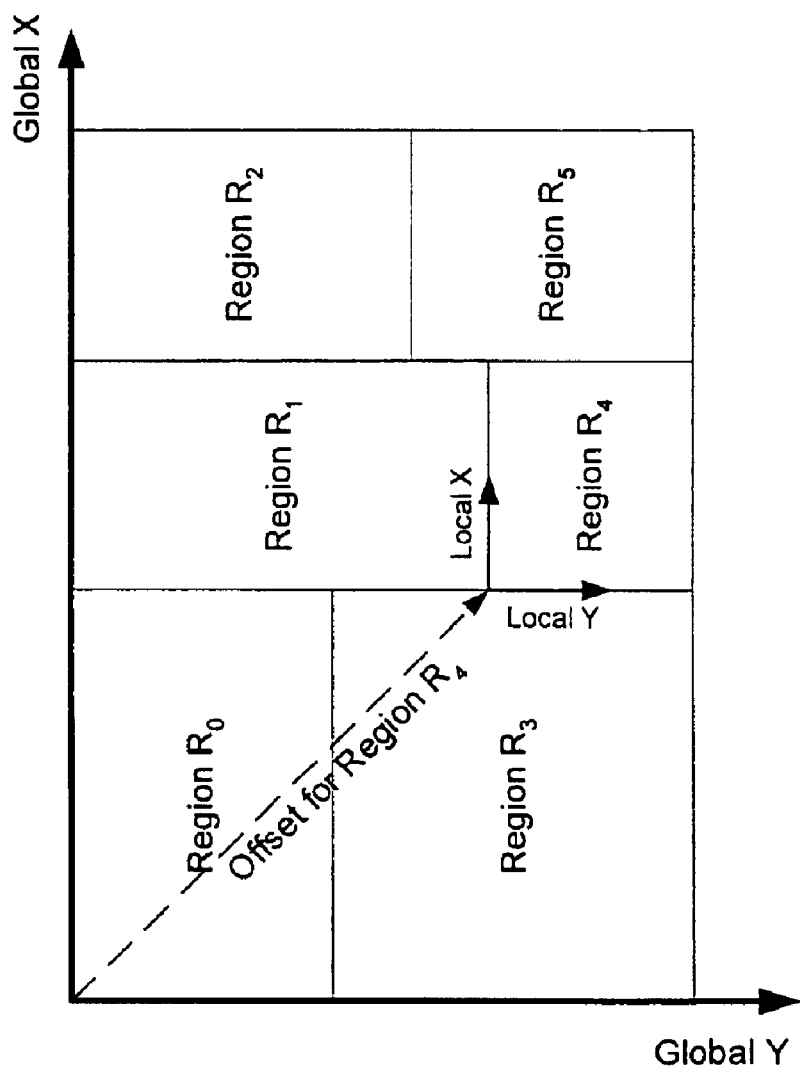
FIG. 26 illustrates an offset to adjust a location in a local coordinate system to a global coordinate system.

Each graphics accelerator GA(K) of the plurality of graphics accelerators may generate video pixels for a corresponding region $R_K$ of a global managed area corresponding to the display device as suggested by FIG. 26. Each graphics accelerator GA(K) may have its own rendering engine 300, sample buffer 500 and filtering engine 600. Thus, each graphics accelerator GA(K) of the plurality of graphics accelerators may have its own local coordinate system $L_K$ for expressing two-dimensional addresses of bins in its sample buffer 500. The graphics accelerator GA(K) may include a plurality of the sample generation circuits. For example, each rendering pipeline and each filtering unit of the graphics accelerator GA(K) may have a sample generation circuit.

The rendering pipelines of graphics accelerator GA(K) generate sample positions and compute samples based on the sample positions, and store the computed sample in the sample buffer of graphics accelerator GA(K). The filtering units of graphics accelerator GA(K) are operable to read samples from the sample buffer and regenerate the same sample positions in order to calculate appropriate filter coefficients for the samples. Each of the sample generation circuits includes a phase-offset adder unit as described above. The phase-offset adder units in the sample generation circuits of graphics accelerator GA(K) allow the local coordinate system $L_K$ to be arbitrarily positioned with respect to the origin of a global coordinate system (corresponding to the global managed area) while maintaining the agreement on sample positions between each rendering pipeline and each filter unit of graphics accelerator GA(K).

In order to coordinate the generation of sample locations across the multiple local coordinate systems, a host software routine (executing on a host computer coupled to the plurality of graphics accelerators) may write appropriate values of the two-dimensional offset $(X_{Phase}, Y_{Phase})$ to the sample generation circuits in each graphics accelerator. For example, the host software routine may set the two-dimensional offset $(X_{Phase}, Y_{Phase})$ for the sample generation circuit in each rendering pipeline of graphics accelerator GA(K) equal to the two-dimensional displacement from the origin of the global coordinate system to the origin of the local coordinate system $L_K$.

Figure 27A:
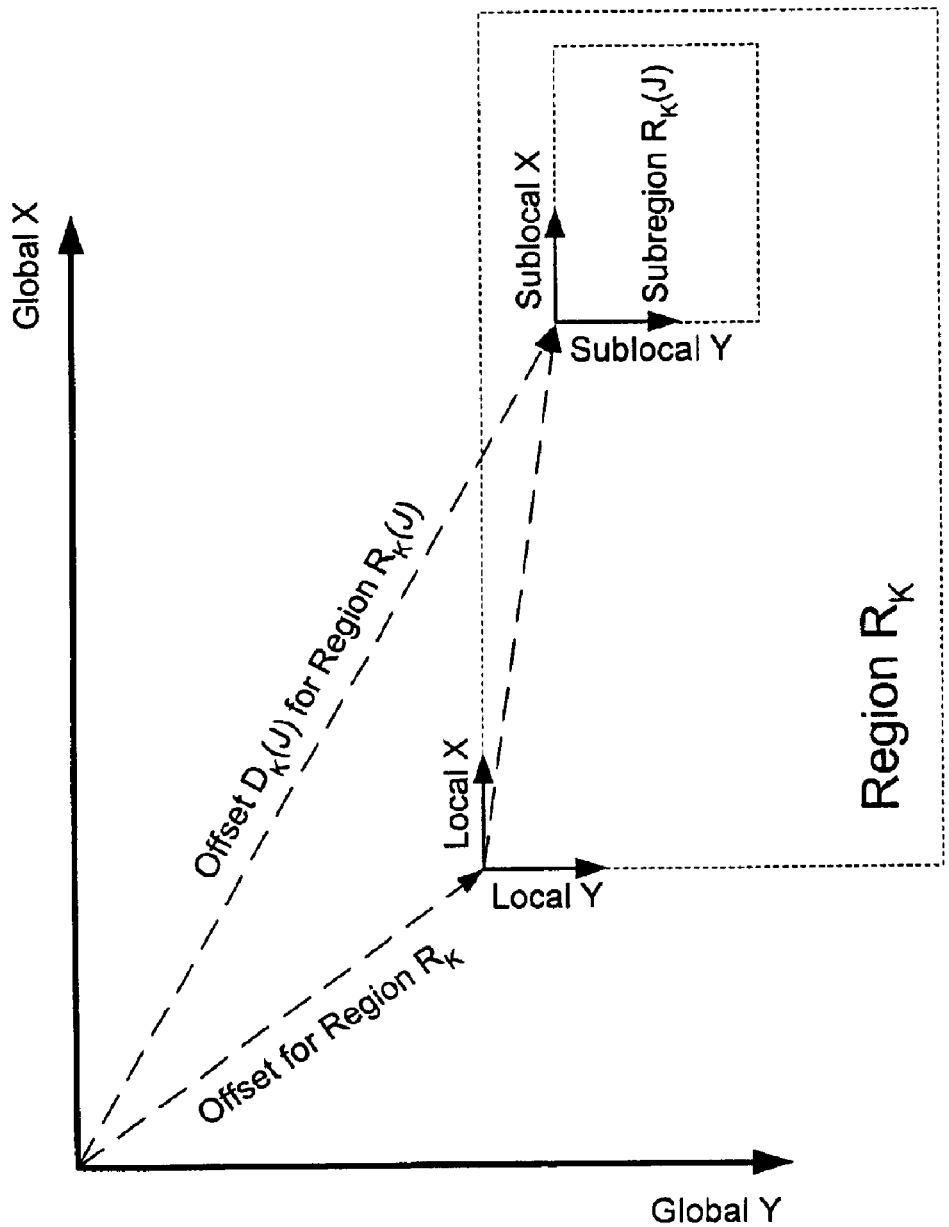
FIG. 27A illustrates offsets of a region $R_K$ and a subregion $R_K(J)$ with respect to the global coordinate system.

Furthermore, the filtering units $FU_K(0)$, $FU_K(1)$, $FU_K(2)$, . . . , $FU_K(N_f-1)$ in graphics accelerator GA(K) may partition the effort of generating pixels for region $R_K$ with each filtering unit $FU_K(J)$ being responsible for a corresponding subregion $R_K(J)$ of the region $R_K$. In some embodiments, the filtering units $FU_K(J)$ may each have their own sublocal coordinate systems $L_K(J)$ within the local coordinate system $L_K$. Thus, the two-dimensional offsets for the sample generation circuits in the respective filtering units $FU_K(J)$ may be programmed with different values to reflect the displacements $D_K(J)$ from the origin of the global coordinate system to the respective origins of the sublocal coordinate systems $L_K(J)$. Host software may determine each displacement $D_K(J)$ by computing a sum of (a) a displacement from the origin of the global coordinate system to the origin of the local coordinate system $L_K$ and (b) a displacement from the origin of the local coordinate system to an origin of the sublocal coordinate system $L_K(J)$ as suggested by FIG. 27A.

Figure 27B:
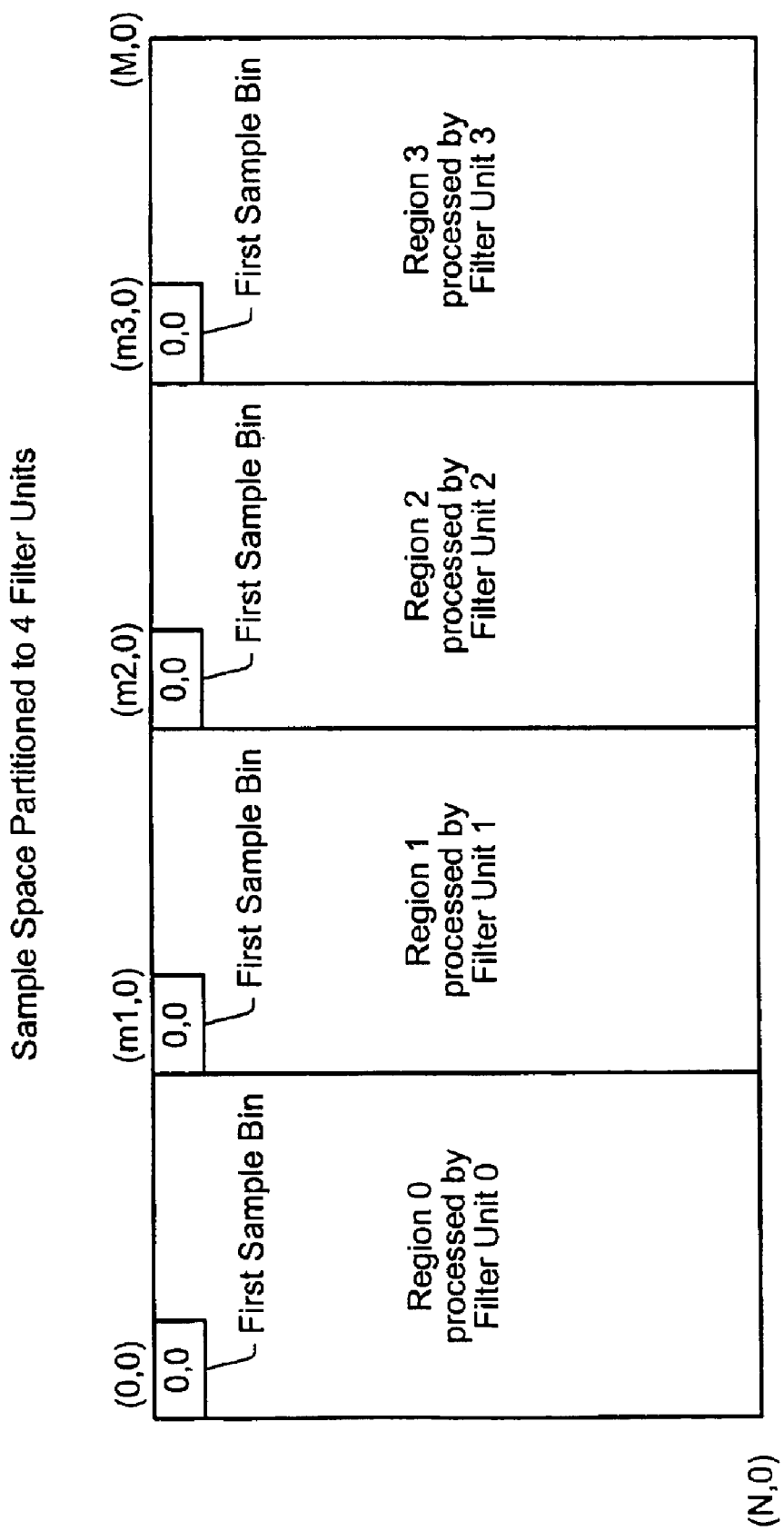
FIG. 27B illustrates offsets for regions of sample space partitioned to multiple filter units.

In one set of embodiments, each filter unit of a set of filter units may include a copy of permutation logic unit 1000 (of FIG. 22). The permutation logic unit 1000 in each filter unit may be configured to receive an x phase and y phase offset that may be added to the kernel x and kernel y numbers respectively, to adjust the sample bin locations to a global address. This may remove artifacts that may be caused when sample space is partitioned between a set of clustered filter units with local coordinate systems. Without the offset adjustments, the first bin in each partition would have an (x,y) location of (0,0), even though the actual bin location in global sample space may be (m1,0), as shown in FIG. 27B for partition 1.

Each filter unit receives an x,y "bias" offset that adjusts a sample location pattern within a sample space region addressed by the filter unit to reflect a global coordinate system that spans the multiple regions addressed by the set of filter units. In this way, multiple filter units may be programmed so that their jitter patterns line up across the boundaries defining their regions.

Window-Relative Permutation Patterns

It is typical for modern operating systems to generate a set of windows on a set of one or more display screens. For example, a first window may display a video game, a second window may display a word processing application, a third window may contain a spreadsheet, and so on. In one alternative set of embodiments, a system of one or more graphics accelerators may be configured so that each window has a permutation pattern that it rigidly attached to the window. The window-relative permutation patterns are generally not continuous across window boundaries. However, the discontinuity of graphics content across window boundaries implies that this lack of permutation pattern continuity is not likely to be noticed by users.

Host software may provide support for the window-relative permutation patterns by appropriate management of the two-dimensional offsets $(X_{Phase}, Y_{Phase})$ for the sample generation circuits in the rendering pipelines, and an augmentation to the structure of the sample generation circuits in the filtering units.

Figure 28:
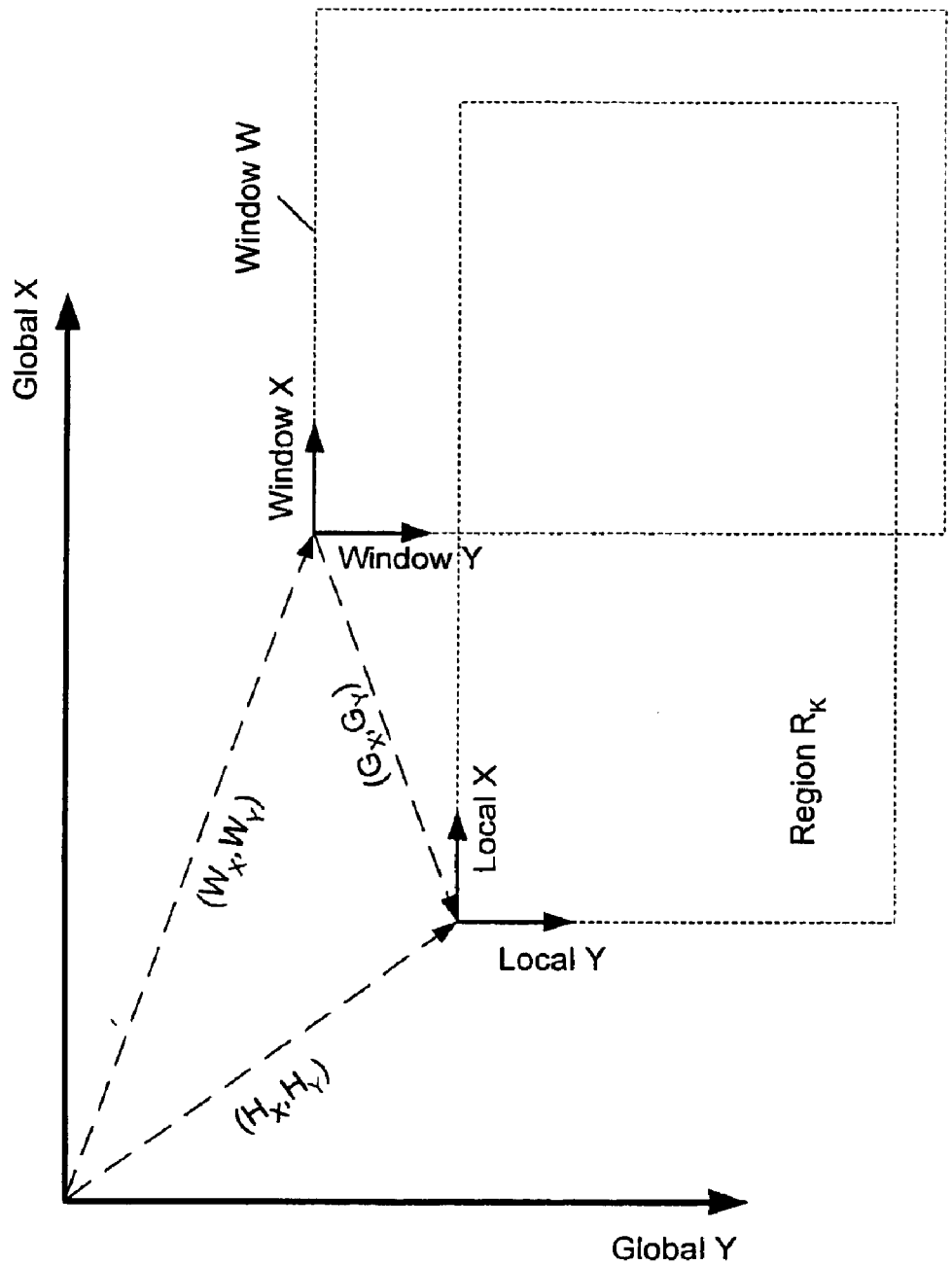
FIG. 28 illustrates offsets of a window W and a region $R_K$ relative to the global coordinate system, and an offset of region $R_K$ with respect to the window W.

In preparation for the rendering of primitives for a given window W, host software may compute the displacement $(G_X, G_Y)$ of the origin of the local coordinate system $L_K$ (corresponding to region $R_K$) with respect to the origin of the window W as suggested by FIG. 28, and write the displacement $(G_X, G_Y)$ to the phase register in each of one or more rendering pipelines of graphics accelerator GA(K) that will participate in the rendering of window W. Furthermore, this computation and writing may be performed for each graphics accelerator GA(K) participating in the rendering of window W.

Figure 25:
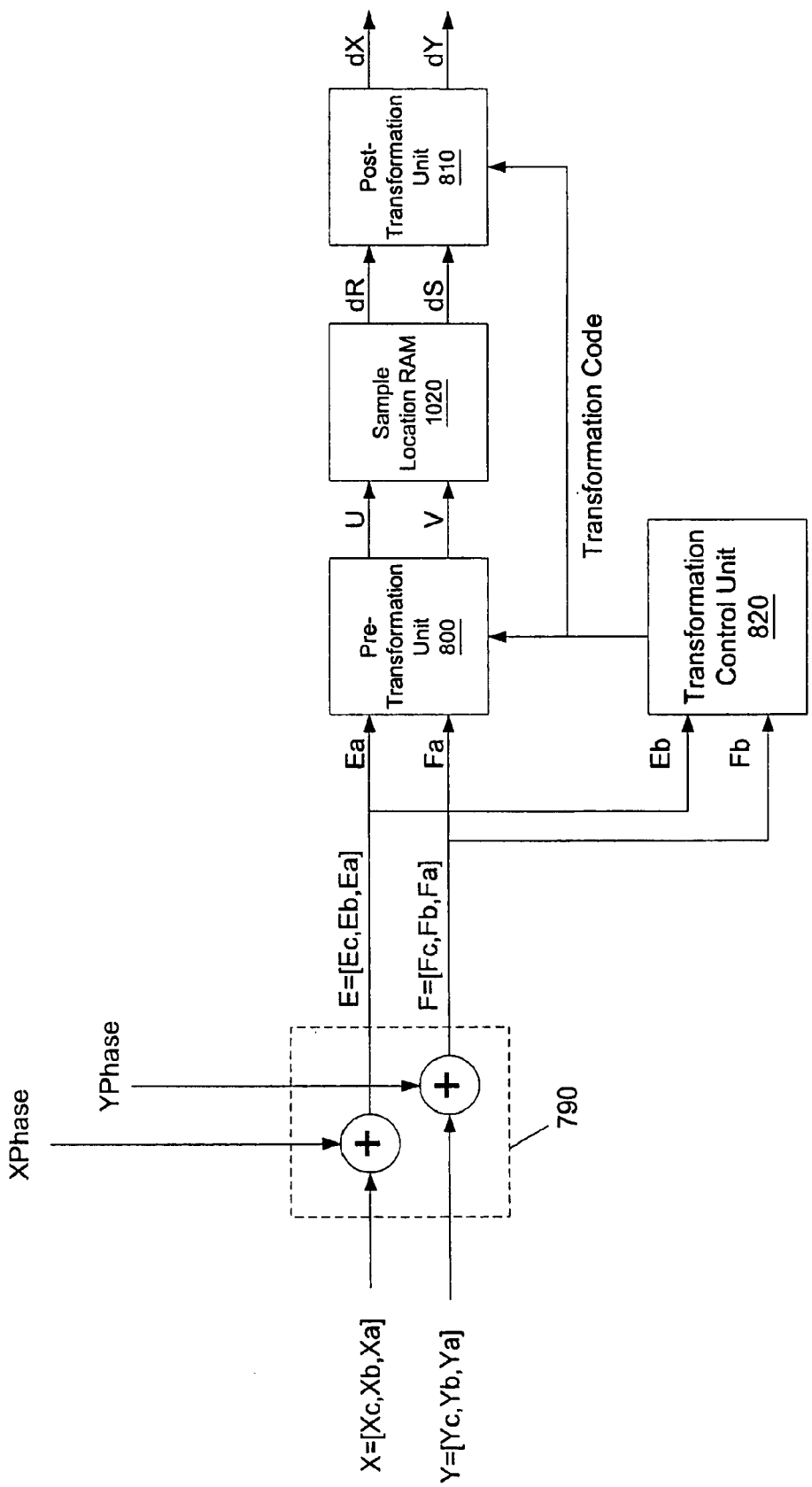
FIG. 25 illustrates a set of embodiments of a system for reproducing pre-selected sample locations and maintaining continuity of sample location jitter pattern across clustered accelerators.

The phase register in a rendering pipeline stores the two-dimensional offset $(X_{Phase}, Y_{Phase})$ for the sample generation circuit in that rendering pipeline. Thus, the assignment $(X_{Phase}, Y_{Phase}) \leftarrow (G_X, G_Y)$ which is induced by the register write operation implies that the two-dimensional addresses (E,F) generated by the sample generation circuit (as shown in FIG. 25) will be relative to the origin of the window W, instead of to the origin to of the global coordinate system. Thus, the origin of the permutation pattern of sample locations produced by the sample generation circuit will coincide with the origin of the window W.

The phase register and the sample generation circuit of a rendering pipeline may be situated in the rendering unit 320 of that rendering pipeline.

Host software may compute the displacement $(G_X, G_Y)$ by subtracting (a) the displacement $(W_X, W_Y)$ of the origin of window W with respect to the origin of the global coordinate system from (b) the displacement $(H_x, H_y)$ of the origin of the local coordinate system $L_K$ with respect to the origin of the global coordinate system. In other words, $G_X \leftarrow H_X - W_X$ and $G_Y \leftarrow H_Y - W_Y$.

Each rendering pipeline embeds the window ID of the window W in the samples it computes for window W prior to transferring the samples to sample buffer 500. Sample buffer 500 may include intelligent memory units (such as 3DRAM64 chips) with built-in arithmetic logic units (ALUs). In addition to z-comparison, the ALUs may be configured to perform window ID comparisons to determine when an incoming sample (i.e., a sample sent by a rendering pipeline) is to overwrite an existing sample in the sample buffer 500.

Figure 29:
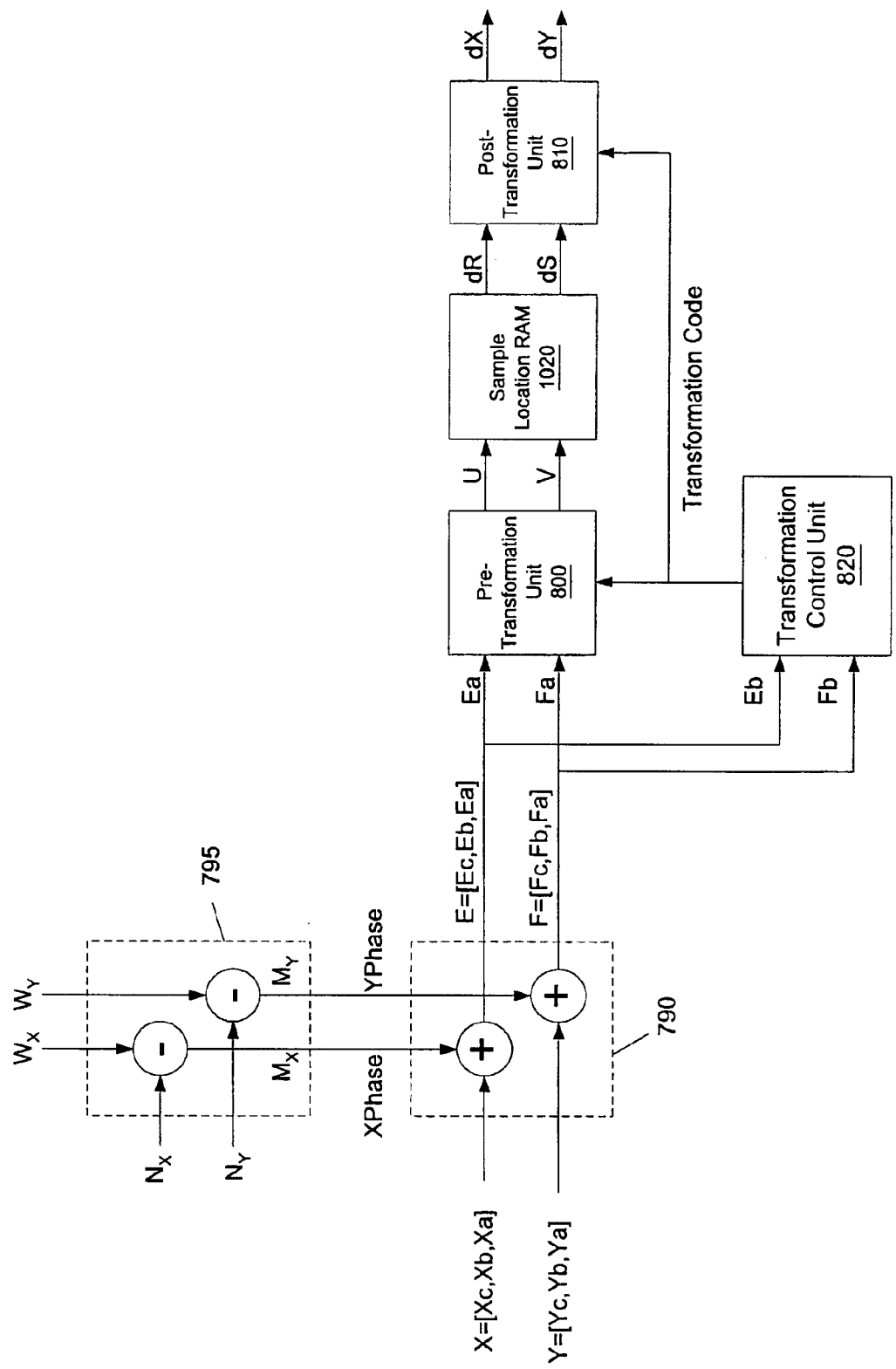
FIG. 29 illustrates one set of embodiments of a sample generation circuit configured to compute sample locations based on a window-relative bin address (E,F)

The sample generation circuit in each filtering unit may be augmented to support the generation of window-relative permutation patterns as indicated in FIG. 29. The sample generation circuit may include a subtraction unit 795. The subtraction unit may receive the displacement $(N_X, N_Y)$ and the displacement $(W_X, W_Y)$, and compute the displacement $(M_X, M_Y)$ according to the relations $M_X \leftarrow N_X - W_X$ and $M_Y \leftarrow N_Y - W_Y$. The displacement $(M_X, M_Y)$ is fed to the phase input $(X_{Phase}, Y_{Phase})$ of adder 790. The displacement $(N_X, N_Y)$ may represent the displacement of a sublocal coordinate system $L_K(J)$ with respect to the global origin. The displacement $(W_X, W_Y)$ may represent the displacement of a current window with respect to the global origin. The two-dimensional address (X,Y) may be defined relative to the sublocal coordinate system $L_K(J)$. Thus, the two-dimensional address (E,F) produced by the sample generation circuit will be relative to the current window origin. Therefore, the sample locations produced by the sample generation circuit will be consistent with a permutation pattern whose origin coincides with the window origin.

A frame of rendered samples, generated by the rendering pipelines, stored in sample buffer 500 and made available to the filtering units may represent a plurality of windows.

Thus, any given filtering unit may receive samples (from sample buffer 500) corresponding to a number of different windows in the course of scanning through the corresponding subregion to generate video output pixels. Therefore, a filtering unit may include a window ID table to store window-related information addressable by window ID. Recall that window ID is one of the components of the sample as stored in sample buffer 500. The window-related information may include the values $(W_X, W_Y)$ for each currently allocated window. Host software may update the window-related information as windows are created, translated, resized, destroyed, etc.

Figure 30:
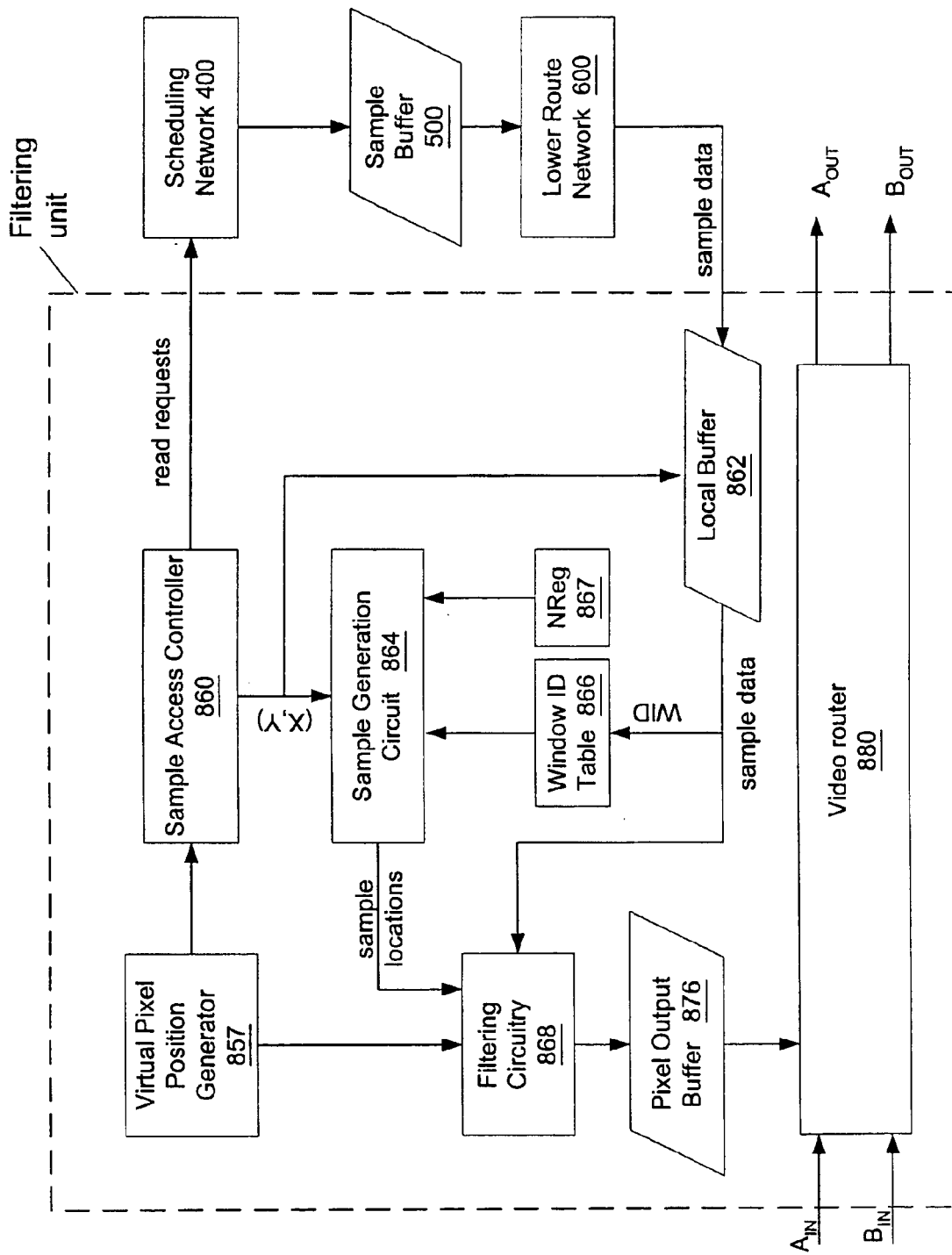
FIG. 30 illustrates one set of embodiments of a filtering unit configured to generate sample locations in a window-relative fashion.

A filtering unit may have the structure suggested by FIG. 30. Virtual pixel position generator 857 may generate a stream of virtual pixel positions (also known as kernel centers or filter centers) in virtual screen space. Sample access controller 860 asserts sample read requests to scheduling network 400 in response to the stream of virtual pixel positions. Scheduling network 400 invokes the transfer of the requested samples from sample buffer 500 through lower route network 600, to local buffer 862. Local buffer 862 may contain the bin scanline memories described above. Furthermore, sample access controller 860 may generate bin addresses (X, Y) based on the stream of virtual pixel positions. The bin addresses may specify bin locations within a sublocal coordinate system $L_K(J)$ corresponding to subregion $R_K(J)$. The bin addresses (X,Y) may be supplied to sample generation circuit 864 and local buffer 862.

In response to a bin address (X,Y), local buffer 862 may transfer samples of the corresponding bin B(X,Y) to filtering circuitry 868. Each sample may include a window ID. The window ID specifies which window "owns" the sample. The window ID of a representative sample from the bin B(X,Y) may be used to invoke read operation from window ID table 866. The read operation produces window-related information for the window defined by the window ID. The displacement $(W_X, W_Y)$ embedded in the window-related information may be supplied to sample generation circuit 864. Sample generation circuit 864 may have the structure indicated in FIG. 29.

The N-register 867 supplies the displacement $(N_X, N_Y)$ to the corresponding inputs of the sample generation circuit 864. Host software stores an appropriate value of the displacement $(N_X, N_Y)$ in the N-register of each filtering unit $FU_K(J)$ of each graphics accelerator GA(K).

By virtue of the host programming of the N-register 867 and the window ID table 866, the sample generation circuit 864 produces sample locations for bin B(X,Y) consistent with a permutation pattern whose origin is rigidly tied to the origin of the window designed by the representative sample. The sample locations for bin B(X,Y) are provided to filtering circuitry 868.

Filtering circuitry 868 filters the samples provided by the local buffer 862 using the sample locations provided by sample generation circuit 864 to obtain video output pixels. The video output pixels are stored into pixel output buffer 876.

Video router 880 may read the video output pixels from output buffer 876 and blend (or substitute) the video output pixels into video stream $A_{IN}$ or $B_{IN}$ as taught in U.S. patent application Ser. No. 09/894,617 filed on Jun. 27, 2001, entitled "Flexible Video Architecture for Generating Video Streams". Video router 880 may thus generate video output streams $A_{OUT}$ and $B_{OUT}$.

With window-relative generation of sample locations, host software may move a window W relative to the global coordinate system, and thus, relative to the local coordinate systems which correspond to the graphics accelerators, without re-rendering the samples $S_W$ owned by the window W. Host software may achieve the movement of window W by copying (i.e., commanding an appropriate subset of the graphics accelerators to copy) the samples $S_W$ from (a) the one or more sample buffers containing portions of the window W in its original position to (b) the one or more sample buffers containing portions of the window in its new position. Since the filtering units are configured to generate sample locations in a window-relative fashion as described above, the sample locations generated by the filtering units for filtration of the samples $S_W$ will be consistent with the sample locations originally created and used by the rendering units to compute the samples $S_W$.

As the window W may traverse one or more boundaries between regions $R_K$ assigned to the graphics accelerators, continuity of the permutation pattern of sample locations generated within the window W across region boundaries is still an important issue. The fact that each sample generation circuit in each graphics accelerator computes a window-relative bin address (E,F) for each window implies that this continuity is maintained as desired within each window.

Numerous variations and modifications will become apparent to those skilled in the art once the above disclosure is fully appreciated. It is intended that the following claims be interpreted to embrace all such variations and modifications.

What is claimed is:

1. A system for generating sample locations that span a plurality of local coordinate systems, the system comprising:
   a plurality of sample generation circuits, wherein each sample generation circuit is configured to:
   receive a two-dimensional bin address specifying a position of a bin in a local sample space region served by the circuit, and a two-dimensional bin offset of an origin of a coordinate system for the local sample space region with respect to an origin of a global sample space coordinate system that contains the local sample space region; and
   generate an output sequence of one or more sample displacements that correspond to a pre-selected transformation applied to a pre-selected set of sample displacements corresponding to a global address, wherein the global address is the vector sum of the two-dimensional bin address and the two-dimensional bin offset.

2. The system of claim 1, wherein the pre-selected transformation is a pre-selected set of two or more transformations sequentially applied to a pre-selected set of sample displacements corresponding to the global address.

3. The system of claim 1, further comprising a plurality of graphics accelerators, wherein each graphics accelerator has one or more local coordinate systems $L_K$ for a region $R_K$ of global sample space, wherein each graphics accelerator comprises one or more rendering pipelines, sample buffers and filtering units, and wherein each rendering pipeline and each filtering unit has a sample generation circuit.

4. The system of claim 3, wherein each graphics accelerator generates video pixels corresponding to one or more regions of global sample space, and the plurality of graphics accelerators collaboratively generate a composite image for one or more display devices.

5. The system of claim 3, wherein a host computer is operable to coordinate the generation of sample locations across the multiple local coordinate systems, by sending a two-dimensional offset for each local coordinate system $L_K$ to the corresponding graphics accelerator.

6. The system claim 3, wherein a host computer is operable to send a two-dimensional composite offset to a first filtering unit in a first of said graphics accelerators, wherein the two-dimensional composite offset is a sum of (a) a displacement from an origin of the global sample space coordinate system to an origin of a first local coordinate system corresponding to the first graphics accelerator and (b) a displacement from an origin of the first local coordinate system to an origin of a sublocal coordinate system corresponding to the first filtering unit.

7. A system for generating sample locations that span a plurality of local coordinate systems, the system comprising:
a plurality of sample generation circuits, wherein each sample generation circuit is configured to:
receive a two-dimensional bin address specifying a position of a bin in a local coordinate system corresponding to the circuit, and a two-dimensional bin offset of an origin of the local coordinate system with respect to an origin of a global sample space coordinate system;
determine a global address of the bin by forming the vector sum of the two-dimensional bin address and the two-dimensional bin offset; and
generate an output sequence of one or more sample displacements that correspond to a pre-selected transformation applied to a pre-selected set of sample displacements corresponding to the global address.

8. The system of claim 7, wherein the sample generation circuits reside in respective rendering units of a graphics accelerator, wherein a host computer is operable to set the two-dimensional bin offset of each sample generation circuit equal to a displacement from an origin of the global sample space coordinate system to an origin of a region served by the graphics accelerator.

9. The system of claim 7, wherein the sample generation circuits reside in respective filtering units of a graphics accelerator, wherein a host computer is operable to set the two-dimensional bin offset for each filtering unit is equal to a composite offset, wherein the composite offset equals a sum of (a) a displacement from an origin of the global sample space coordinate system to an origin of a region served by the graphics accelerator and (b) a displacement from an origin of the served region to an origin of a subregion corresponding to the filtering unit.

10. A system for generating sample locations that span a plurality of local coordinate systems, the system comprising:
a plurality of sample generation circuits, wherein each sample generation circuit $S_K$ is configured to:
receive a two-dimensional bin address specifying a position of a bin in a local sample space coordinate system $L_K$ for the sample generation circuit $S_K$, and a two-dimensional bin offset of an origin of the local sample space coordinate system $L_K$ with respect to an origin of a global sample space coordinate system:
add the two-dimensional local bin address and the two-dimensional bin offset to generate a two-dimensional global bin address;
select a first portion of the two-dimensional global bin address and identify a corresponding transformation based on the first portion and a pre-selected pattern of transformations that span global sample space;
apply an inverse of the identified transformation to a second portion of the two-dimensional global bin address, thereby generating a memory address for a sample bin containing pre-selected sample displacements;
read a first sequence of one or more sample displacements from the sample bin; and
generate an output sequence of sample displacements by applying the first transformation to the first sequence of sample displacements.

11. A system for generating sample locations that span a plurality of local coordinate systems, the system comprising:
a plurality of sample generation circuits, wherein each sample generation circuit $S_K$ comprises:
an adder unit configured to:
receive a two-dimensional bin address specifying a position of a bin in a local sample space coordinate system $L_K$ for the sample generation circuit $S_K$, and a two-dimensional bin offset of an origin of the local sample space coordinate system $L_K$ with respect to an origin of a global sample space coordinate system; and
add the two-dimensional local bin address and the two-dimensional bin offset to generate a two-dimensional global bin address;
a transformation control unit configured to receive a first portion of the two-dimensional global bin address and identify a corresponding transformation based on the first portion and a pre-selected pattern of transformations that span global sample space;
an address transform unit, wherein the address transform unit is configured to apply an inverse of the identified transformation to a second portion of the two-dimensional global bin address, thereby generating a memory address defining a bin from a tile of bins containing pre-selected sample displacements;
a sample location memory configured to store the pre-selected sample displacements for a tile of bins, wherein the sample location memory is configured to output a first sequence of sample displacements in response to receiving the memory address; and
an output transform unit, wherein the output transform unit is configured to apply the identified transformation to the first sequence of sample displacements in response to receiving the transformation code, thereby generating a second output sequence of sample displacements.

12. The system of claim 11, wherein the adder unit comprises an "x" component adder and a "y" component adder.

13. The system of claim 11, wherein the first portion of the global address is [Eb, Fb] and the second portion of the global address is [Ea, Fa]; wherein the horizontal component E of the two-dimensional global bin address is represented as E=[Ec,Eb,Ea]; wherein Ea is a contiguous set of least significant bits in E, Eb is a contiguous set of medium significant bits in E, and Ec is a contiguous set of next more significant bits in E; wherein sizes of Ea, Eb and Ec are "a" bits, "b" bits and "c" bits respectively; wherein the vertical component F of the two-dimensional global bin address is represented as F=[Fc,Fb,Fa], wherein Fa is a contiguous set of least significant bits in F, Fb is a contiguous set of medium significance bits in F, and Fc is a contiguous set of next more significant bits in F; and wherein sizes of Fa, Fb and Fc are "a" bits, "b" bits and "c" bits respectively, "a" and "b" are integers greater than or equal to one, and c is an integer greater than or equal to zero.

14. The system of claim 11, wherein the tile of bins containing pre-selected sample displacements is a rectangular array of sample bins.

15. A method for generating sample locations spanning a plurality of local coordinate systems, the method comprising:

receiving a two-dimensional bin address specifying a position of a bin in a local sample space region, and a two-dimensional bin offset of an origin of a coordinate system for the local sample space region with respect to an origin of a global sample space coordinate system that contains the local sample space region; and generating an output sequence of one or more sample displacements that correspond to a pre-selected transformation applied to a pre-selected set of sample displacements corresponding to a global address, wherein the global address is the vector sum of the two-dimensional bin address and the two-dimensional bin offset.

16. The method of claim 15, wherein the pre-selected transformation is a pre-selected set of two or more transformations sequentially applied to a pre-selected set of sample displacements corresponding to the global address.

17. A method for generating sample locations that span a plurality of local coordinate systems, the method comprising:

receiving a two-dimensional bin address specifying a position of a bin in a local sample space region served by the circuit, and a two-dimensional bin offset of an origin of a coordinate system for the local sample space region with respect to an origin of a global sample space coordinate system that contains the local sample space region;

determining a global address of the bin by forming the vector sum of the two-dimensional bin address and the two-dimensional bin offset; and generating an output sequence of one or more sample displacements that correspond to a pre-selected transformation applied to a pre-selected set of sample displacements corresponding to the global address.

18. A method for generating sample locations spanning a plurality of local coordinate systems, the method comprising:

transferring a plurality of two-dimensional bin offsets to a plurality of sample generation circuits respectively, wherein the two-dimensional bin offset transferred to each sample generation circuit $S_K$ of the plurality of sample generation circuits equals the displacement of an origin of a corresponding local coordinate system $L_K$ with respect to an origin of a global coordinate system, wherein each sample generation circuit $S_K$ performs the actions of:

receiving a two-dimensional local address of a sample bin with respect to the local coordinate system $L_K$;

adding the two-dimensional local address to the corresponding two-dimensional bin offset to determine a two-dimensional global bin address;

operating on a first portion of the two-dimensional global bin address to identify a corresponding transformation based on the first portion and a pre-selected pattern of transformations that span global sample space;

applying an inverse of the first transformation to a second portion of the two-dimensional global bin address to determine a modified two-dimensional address;

reading first sample displacements from a sample location memory using the modified two-dimensional address; and applying the first transformation to the first sample displacements to determine second sample displacements.

19. The method of claim 18, wherein each sample generation circuit $S_K$ performs the additional action of adding the second sample displacements to the two-dimensional local address of the sample bin to generate local sample locations.

20. The method of claim 18, wherein the first portion of the global address is [Eb, Fb] and the second portion of the global address is [Ea, Fa]; wherein the horizontal component E of the two-dimensional global bin address is represented as E=[Ec,Eb,Ea]; wherein Ea is a contiguous set of least significant bits in E, Eb is a contiguous set of medium significant bits in E, and Ec is a contiguous set of next more significant bits in E; wherein sizes of Ea, Eb and Ec are "a" bits, "b" bits and "c" bits respectively; wherein the vertical component F of the two-dimensional global bin address is represented as F=[Fc,Fb,Fa], wherein Fa is a contiguous set of least significant bits in F, Fb is a contiguous set of medium significance bits in F, and Fc is a contiguous set of next more significant bits in F; and wherein sizes of Fa, Fb and Fc are "a" bits, "b" bits and "c" bits respectively, "a" and "b" are integers greater than or equal to one, and c is an integer greater than or equal to zero.

21. A method for selecting sample positions for a specific sample bin in a region of sample space corresponding to one of a set of clustered graphics accelerators comprising:

selecting sample locations for an Mi×Ni array of sample bins located in region(i) sample space by:

selecting sample locations for each sample bin of an n×n array of sample bins, wherein each bin has k sample locations, wherein $n=2^a$, and wherein a and k are positive integers;

storing the sample locations for the n×n array of sample bins in a memory;

selecting an m×m array of 2-D transformations;

applying the transformation specified at each position in the m×m array to the n=n array of sample bins to populate sample locations in an nm×nm array of sample bins, wherein $m=2^b$;

tiling the nm×nm sample bin array across the available sample space;

generating sample locations by using a logic circuit configured to:

sum the respectively x value and y value for sample bin location (x,y) in region(i) sample space coordinates and the x value and y value of bin (0,0) in region(i) in a global sample space coordinate system that spans the regions (i);

operate on the b+a least significant bits of the x and y sums to select a specific transformation T from the m×m array of transformations and to select a specific sample bin, from the n×n array of sample bins, that correspond to the sample bin location (x,y) in region (i); and generate one or more sample positions by applying transformation T to a first one or more of the k sample positions stored in the memory for the specific sample bin.

22. The method of claim 21, wherein transformation T is a pre-selected set of two or more transformations that are sequentially applied.

23. A system for generating sample locations that span a plurality of local coordinate systems, the system comprising:

means for receiving a two-dimensional bin address specifying a position of a bin in a local sample space region served by the circuit, and a two-dimensional bin offset of an origin of a coordinate system for the local sample space region with respect to an origin of a global sample space coordinate system that contains the local sample space region; and means for generating an output sequence of one or more sample displacements that correspond to a pre-selected transformation applied to a pre-selected set of sample displacements corresponding to a global address, wherein the global address is the vector sum of the two-dimensional bin address and the two-dimensional bin offset.

24. The system of claim 23, wherein the pre-selected transformation is a pre-selected set of two or more transformations sequentially applied to a pre-selected set of sample displacements corresponding to the global address.

25. A system comprising:
a plurality of sample generation circuits, wherein each sample generation circuit is configured to:
receive a two-dimensional bin address specifying a position of a bin in a local coordinate system corresponding to the circuit, and a two-dimensional bin displacement of an origin of the local coordinate system with respect to an origin of a window;
determine a window-relative bin address of the bin by computing a vector sum of the two-dimensional bin address and the two-dimensional bin displacement;
generate an output sequence of one or more sample displacements that correspond to a transformation designated by the window-relative bin address.

26. The system of claim 25, wherein the sample generation circuits reside in respective rendering units of a graphics accelerator, wherein a host computer is operable to set the two-dimensional bin displacement of each sample generation circuit equal to a displacement from an origin of the global sample space coordinate system to an origin of a region served by the graphics accelerator.

27. A system comprising:
a plurality of sample generation circuits, wherein each sample generation circuit $S_K$ comprises:
an adder unit configured to:
receive a two-dimensional bin address specifying a position of a bin in a local sample space coordinate system $L_K$ for the sample generation circuit $S_K$, and a two-dimensional bin offset of an origin of the local sample space coordinate system $L_K$ with respect to an origin of a window; and
add the two-dimensional local bin address and the two-dimensional bin offset to generate a two-dimensional window-relative bin address;
a transformation control unit configured to receive a first portion of the two-dimensional window-relative bin address and identify a corresponding transformation based on the first portion and a pre-selected pattern of transformations;
an address transform unit, wherein the address transform unit is configured to apply an inverse of the identified transformation to a second portion of the two-dimensional window-relative bin address, thereby generating a memory address defining a bin from a tile of bins containing pre-selected sample displacements;
a sample location memory configured to store the pre-selected sample displacements for a tile of bins, wherein the sample location memory is configured to output a first sequence of sample displacements in response to receiving the memory address; and
an output transform unit, wherein the output transform unit is configured to apply the identified transformation to the first sequence of sample displacements, thereby generating a second output sequence of sample displacements.

28. The system of claim 27, wherein a host computer is operable to:

compute the two-dimensional bin offset for sample generation circuit $S_K$ by subtracting (a) a displacement of the window with respect to an origin of a global sample space coordinate system from (b) a displacement of the local sample space coordinate system $L_K$ with respect to the origin of the global sample space coordinate system; and
supply the two-dimensional bin offset to the sample generation circuit $S_K$;
repeat said computing and said supplying for each said sample generation circuits.

29. A system comprising:
a window ID table configured to output a displacement $(W_X, W_Y)$ of a window with respect to an origin of a global sample space coordinate system in response to receiving a window ID;
a first register configured to store a displacement $(N_X, N_Y)$ of a first coordinate system with respect to an origin of the global sample space coordinate system;
a sample generation circuit including:
a subtraction unit configured to compute a displacement $(M_X, M_Y)$ by subtracting the displacement $(W_X, W_Y)$ from the displacement $(N_X, N_Y)$;
an adder unit configured to receive a bin address $(X, Y)$ specifying a position of a bin in the first coordinate system, and to compute a window-relative bin address by adding the bin address $(X, Y)$ to the displacement $(M_X, M_Y)$;
a transformation control unit configured to receive a first portion of the window-relative bin address and identify a corresponding transformation based on the first portion and a pre-selected pattern of transformations;
an address transform unit, wherein the address transform unit is configured to apply an inverse of the identified transformation to a second portion of the two-dimensional window-relative bin address, thereby generating a memory address defining a bin from a tile of bins containing pre-selected sample displacements;
a sample location memory configured to store the pre-selected sample displacements for a tile of bins, wherein the sample location memory is configured to output a first sequence of sample displacements in response to receiving the memory address; and
an output transform unit, wherein the output transform unit is configured to apply the identified transformation to the first sequence of sample displacements, thereby generating a second output sequence of sample displacements.

30. The system of claim 29, wherein a host computer is operable to:
compute and store the displacement $(N_X, N_Y)$ in the first register;
store the displacement $(W_X, W_Y)$ for each window of a collection of windows in the window ID table.

31. The system of claim 30, wherein the host computer is operable to:
update the displacement $(N_X, N_Y)$ in response to a user movement of the window.

32. The system of claim 29, wherein the window ID is a component of a received sample accessed from a sample buffer.

* * * * *

UNITED STATES PATENT AND TRADEMARK OFFICE
CERTIFICATE OF CORRECTION

PATENT NO.    : 6,943,796 B2                                       Page 1 of 1
DATED         : September 13, 2005
INVENTOR(S)   : Nathaniel David Naegle It is certified that error appears in the above-identified patent and that said Letters Patent is hereby corrected as shown below:

<u>Column 32,</u>
Line 21, delete "for an MixNi array" and substitute -- for an Mi x Ni array --;
Line 24, delete "nxn array of sample" and substitute -- n x n array of sample --;
Line 27, delete "for the nxn array" and substitute -- for the n x n array --;
Line 29, delete "selecting an mxm array" and substitute -- selecting an m x m array --;
Line 31, delete "in the mxm array to the n=n array" and substitute -- in the m x m array to the n x n array --;
Line 32, delete "in an nmxnm array" and substitute -- in an nm x nm array --;
Line 34, delete "the nmxnm sample" and substitute -- the nm x nm sample --;
Line 45, delete "mxm array of transformations" and substitute -- m x m array of transformations --;
Line 46, delete "for the nxn array" and substitute -- for the n x n array --.

Signed and Sealed this

Fourteenth Day of February, 2006

JON W. DUDAS
*Director of the United States Patent and Trademark Office*